(12) United States Patent
Choi et al.

(10) Patent No.: US 8,897,180 B2
(45) Date of Patent: Nov. 25, 2014

(54) MOBILE COMMUNICATION SYSTEM AND CHANNEL TRANSMISSION/RECEPTION METHOD THEREOF

(71) Applicant: Samsung Electronics Co. Ltd., Suwon-si, Gyeonggi-do (KR)

(72) Inventors: Seunghoon Choi, Suwon-si (KR); Joonyoung Cho, Suwon-si (KR); Youngbum Kim, Seoul (KR); Hyoungju Ji, Seoul (KR)

(73) Assignee: Samsung Electroncis Co., Ltd., Suwon-si (KR)

( * ) Notice: Subject to any disclaimer, the term of this patent is extended or adjusted under 35 U.S.C. 154(b) by 117 days.

(21) Appl. No.: 13/779,103

(22) Filed: Feb. 27, 2013

(65) Prior Publication Data

US 2013/0223295 A1  Aug. 29, 2013

Related U.S. Application Data

(60) Provisional application No. 61/604,600, filed on Feb. 29, 2012, provisional application No. 61/610,062, filed on Mar. 13, 2012, provisional application No. 61/621,675, filed on Apr. 9, 2012, provisional application No. 61/651,180, filed on May 24, 2012.

(30) Foreign Application Priority Data

Sep. 7, 2012  (KR) .......................... 10-2012-0099519

(51) Int. Cl.
*H04W 72/04* (2009.01)
*H04L 1/18* (2006.01)
*H04L 5/00* (2006.01)

(52) U.S. Cl.
CPC ............. *H04W 72/0406* (2013.01); *H04L 1/18* (2013.01); *H04L 5/00* (2013.01); *H04W 72/0446* (2013.01); *H04L 5/0055* (2013.01)
USPC .......................................... 370/280; 370/442

(58) Field of Classification Search
CPC ........... H04L 1/18; H04L 5/00; H04L 5/0055; H04W 72/0406; H04W 72/0446
USPC .................. 370/252, 280, 322, 329, 431–442
See application file for complete search history.

(56) References Cited

U.S. PATENT DOCUMENTS

| 8,737,277 B2* | 5/2014 | Jang et al. | ...................... 370/281 |
| 2013/0322357 A1* | 12/2013 | He et al. | ........................ 370/329 |

(Continued)

OTHER PUBLICATIONS

Samsung, 'UL HARQ-ACK timing for TDD CA', R1-120158, 3GPP TSG RAN WG1 #68, Feb. 6, 2012-Feb. 10, 2012, Dresden, Germany.

(Continued)

*Primary Examiner* — Afsar M Qureshi
(74) *Attorney, Agent, or Firm* — Jefferson IP Law, LLP

(57) ABSTRACT

A method for transmitting a physical channel in a Time Division Duplex (TDD) communication system capable of carrier aggregation is provided for supporting aggregation of carriers having different TDD configurations. The communication method of a terminal in a TDD radio communication system accomplishing broadband through carrier aggregation of primary and secondary cells, of which aggregated carriers have different TDD Uplink-Downlink (UL-DL) configurations, includes receiving Physical Downlink Shared Channel (PDSCH) through the secondary cell, and transmitting acknowledgement information corresponding to the PDSCH to a base station, where acknowledgement information is transmitted on a Physical Uplink Control CHannel (PUCCH) of the primary cell.

18 Claims, 7 Drawing Sheets

(56) References Cited

U.S. PATENT DOCUMENTS

| | | | |
|---|---|---|---|
| 2013/0336267 A1* | 12/2013 | Li et al. | 370/329 |
| 2014/0140251 A1* | 5/2014 | Pan et al. | 370/280 |
| 2014/0204878 A1* | 7/2014 | Jang et al. | 370/329 |

OTHER PUBLICATIONS

3GPP TS 36.213 V10.4.0, '3GPP; E-UTRA; Physical Layer Procedures (Release 10), Dec. 22, 2011, Sophia Antipolis Valbonne, France.

Research in Motion et al., 'Design of HARQ and Scheduling Timing Linkage to Support Inter-band CA with Different TDD Configurations', R1-120336, 3GPP TSG RAN WG1 #68, Feb. 6, 2012-Feb. 10, 2010, Dresden, Germany.

Sharp, 'PDSCH HARQ-ACK report with LTE TDD inter-band CA', R1-120274, 3GPP TSG RAN WG1 #68, Feb. 6, 2012-Feb. 10, 2012, Dresden, Germany.

Intel Corp., 'Discussion on HARQ feedback of TDD Inter-band Carrier Aggregation', R1=120207, 3GPP TSG RAN WG1 #68, Feb. 6, 2012-Feb. 10, 2012, Dresden, Germany.

* cited by examiner

MOBILE COMMUNICATION SYSTEM AND CHANNEL TRANSMISSION/RECEPTION METHOD THEREOF

PRIORITY

This application claims the benefit under 35 U.S.C. §119 (e) of a U.S. provisional patent application filed on Feb. 29, 2012 in the U.S. Patent and Trademark Office and assigned Ser. No. 61/604,600, a U.S. provisional patent application filed on Mar. 13, 2012 in the U.S. Patent and Trademark Office and assigned Ser. No. 61/610,062, a U.S. provisional patent application filed on Apr. 9, 2012 in the U.S. Patent and Trademark Office and assigned Ser. No. 61/621,675, and a U.S. provisional patent application filed on May 24, 2012 in the U.S. Patent and Trademark Office and assigned Ser. No. 61/651,180, and under 35 U.S.C. §119(a) of a Korean patent application filed on Sep. 7, 2012 in the Korean Intellectual Property Office and assigned Serial No. 10-2012-0099519, the entire disclosure of each of which is hereby incorporated by reference.

BACKGROUND OF THE INVENTION

1. Field of the Invention

The present invention relates to a mobile communication system. More particularly, the present invention relates to a method for transmitting a physical channel in a Time Division Duplex (TDD) communication system capable of carrier aggregation which supports aggregation of carriers having different TDD configurations.

2. Description of the Related Art

Recently, research is being actively conducted on Orthogonal Frequency Division Multiple Access (OFDMA) and Single Carrier-Frequency Division Multiple Access (SC-FDMA) as high speed data transmission techniques over radio channel. Multiple access techniques are used to allow multiple users to share the radio spectrum by allocating distinct time-frequency resources carrying data or control information to respective users, i.e., maintaining orthogonality.

One of the significant features of the mobile communication system is to support scalable bandwidth for providing a high speed wireless data service. For example, the Long Term Evolution (LTE) system is capable of supporting various bandwidths, e.g., 20/15/5/3/1.4 Mhz. Meanwhile, the LTE-Advanced (LTE-A) system can support high data rate transmission over a wide bandwidth up to 100 MHz for a single User Equipment (UE) with carrier aggregation. The mobile carriers can provide their services with one of the available bandwidths. A UE can operate with various capabilities of minimum 1.4 MHz bandwidth up to 20 MHz bandwidth.

In order to support the high data rate transmission, the LTE-A system uses bandwidth wider than that of the LTE system while preserving backward compatibility to the legacy systems for supporting the LTE UEs. This means that it is required for the LYE terminals to attach to the LTE-A system to receive service.

For the backward compatibility, the system bandwidth of the LTE-A system is divided into a plurality of sub-hands or Component Carriers (CC). In the LTE-A system, the component carriers are aggregated for the high data rate transmission for transmission/reception of the data generated per component carrier. Accordingly, the LTE-A system is capable of providing LTE UEs with high speed data transmission service using the transmission/reception processes of legacy LTE system per component carrier.

The component carriers or cells are classified into a Primary Cell (PCell) and a Secondary Cell (SCell) according to their importance in view of the UE. From the UE's viewpoint, there is one PCell, and other cells of the UE are SCells. In the current LTE-A system, the uplink control channel can be transmitted only in the PCell while the uplink data channels can be transmitted in both the PCell and the SCells.

Typically, the scheduling information for the data to be transmitted on the component carriers is transmitted to the UE in Downlink Control Information (DCI). The DCI is generated in a different DCI format according to whether scheduling information is of uplink or downlink, whether the DCI is compact DCI, whether spatial multiplexing with multiple antennas is applied, and whether the DCI is the power control DCI. For example, the DCI format 1 for the control information about downlink data to which Multiple Input Multiple Output (MIMO) is not applied includes the following control information.

- Resource allocation type 0/1 flag: it notifies the UE of whether the resource allocation type is type 0 or type 1. Here, type 0 indicates resource allocation in a unit of Resource Block Group (RBG) in bitmap method. In LTE and LTE-A systems, the basic scheduling unit is a Resource Block (RB) representing time and frequency resource, and RBG includes a plurality of RBs and basic scheduling unit of type 0. Type 1 indicates allocation of specific RB in RBG.
- Resource block assignment: It notifies the UE of RB allocated for data transmission. At this time, the resource expressed according to the system bandwidth and resource allocation scheme is determined.
- Modulation and coding scheme: It notifies the UE of modulation scheme and coding rate applied for data transmission.
- Hybrid Automatic Repeat reQuest (HARQ) process number: It notifies the UE of a HARQ process number.
- New data indicator: It notifies the LIE of whether the transmission is a HARQ initial transmission or retransmission.
- Redundancy version: It notifies the UE of redundancy version of a HARQ.
- Transport Power Control (TPC) command for a Physical Uplink Control CHannel (PUCCH): It notifies the UE of a power control command for PUCCH as uplink control channel.

The DCI is channel-coded and modulated and transmitted through Physical Downlink Control Channel (PDCCH).

FIG. 1 illustrates a self-scheduling scheme according to the related art. FIG. 1 illustrates a case where an evolved Node B (eNB) schedules downlink data for a UE with two aggregated carriers (CC#1, CC#2) in the LTE system.

Referring to FIG. 1, a DCI 1 101 to be transmitted on a CC#1 109 is generated with a format defined in the legacy LTE, and channel coded and interleaved as denoted by reference number 103 so as to be carried in PDCCH 105. The PDCCH 105 carries the scheduling information about the Physical Downlink Shared Channel (PDSCH) 107 as the data channel allocated to the UE on the CC#1 109.

A DCI 111 transmitted on a CC#2 119 is formatted as defined in the legacy LTE standard, channel-coded, and interleaved as denoted by reference number 113 to generate PDCCH 115. The PDCCH 115 carries the scheduling information about a PDSCH 117 as the data channel allocated to the UE on the CC#2 119.

In the LTE-A system supporting carrier aggregation, the data and/or DCI for supporting the data transmission can be transmitted per component carrier as shown in FIG. 1. In order to secure a high reception reliability of the UE, DCI can be transmitted on another component carrier different from the component carrier carrying the data. This is referred to as cross-carrier scheduling and described with reference to FIG. 2.

FIG. 2 illustrates a cross-carrier scheduling scheme according to the related art. FIG. 2 illustrates a case of the scheduling operation to a LTE-A UE capable of using aggregated component carriers CC#1 209 and CC#2 219.

Referring to FIG. 2, the CC#2 219 experiences significant interference compared to CC#1 209 such that it is difficult to satisfy a predefined DCI reception performance requirement for data transmission on the CC#2 219. In this case, an eNB may transmit the DCI on the CC#1 209 under the assumption that the UE knows that the DCI carrying the scheduling information about the data transmitted on CC#2 219 is transmitted on the CC#1 209.

Since any error occurring in data transmission can be corrected later through HARQ, there is no problem in transmitting data on the CC#2 although significant interference exists thereon. In order to make it possible to operate as above, the eNB needs to transmit a Carrier Indicator (CI) indicating the component carrier targeted by the DCI along with the DCI indicating the resource allocation information and transmission format of the scheduled data. For example, CI='000' indicates CC#1 209 and, '001' indicates CC#2 219.

Accordingly, the eNB combines a DCI 201 indicating resource allocation information and transmission format of the scheduled data 207 and carrier indicator 202 to generate an extended DCI, performs channel coding, modulation, and interleaving as denoted by reference number 203 on the extended DCI to generate PDCCH, and maps the PDCCH to the PDCCH region 205 of CC#1 209. The eNB also combines a DCI 211 indicating the resource allocation information and transmission format of data 217 scheduled on CC#2 219 and a carrier indicator 212 to generate an extended DCI, performs channel coding, modulation and interleaving as denoted by reference number 213 on the extended DCI to generate PDCCH, and maps the PDCCH not to a PDCCH region 215 of CC#1 219 but to a PDCCH region 205 of CC#1 209.

The TDD system uses a common frequency for uplink and downlink which are discriminated in time domain, in the TDD system, the uplink and downlink signals are discriminated by subframe. In the LTE system, the subframe has a length of 1 ms, and 10 subframes form a radio frame.

The distribution of uplink and downlink subframes can be adapted to the traffic load on as to be in a time domain symmetrically (i.e., an equal number of DE and UL subframes) or asymmetrically (i.e., downlink heavy or uplink heavy).

TABLE 1

| Uplink-downlink configuration | Subframe number | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D |

Table 1 shows TDD configurations (TDD uplink-downlink configurations) defined in an LTE standard. In Table 11, subframe numbers 0 through 9 indicate the indices of subframes constituting one radio frame. Here, 'D' denotes a subframe reserved for downlink transmission, 'U' denotes a subframe reserved for uplink transmission, and 'S' denotes the special subframe.

The Downlink Pilot Time Slot (DwPTS) can carry the downlink control information as the normal subframe does. If the DwPTS is long enough according to the configuration state of the special subframe, it is possible to also carry the downlink data. The Guard Period (GP) is the interval required for downlink-to-uplink switch and its length is determined according to the network configuration. The Uplink Pilot Time Slot (UpPTS) can be used for transmitting UE's Sounding Reference Signal (SRS) for uplink channel state estimation and UE's Random Access CHannel (RACH).

For example, in a case of TDD uplink-downlink configuration #6, the eNB can transmit downlink data and/or control information at subframes #0, #5, and #9 and uplink data and/control information at subframes #2, #3, #4, #7, and #8. Here, # indicates a number or an index. Special subframes #1 and #6 can be used for transmitting downlink control information and/or downlink data selectively and SRS or RAGA in uplink.

Since the downlink or uplink transmission is allowed for a specific time duration in the TDD system, the timing relationship among the uplink and downlink physical channels needs to be defined, such as control channel for data scheduling, scheduled data channel, and HARQ ACKnowledgement/Non-ACKnowledgement (ACK/NACK) channel corresponding to the data channel.

As described above, when multiple cells are operating with different TDD UL-DL configurations, the HARQ ACK/NACK transmission which has to be carried in a specific uplink subframe of the PCell does not occur synchronized to the TDD UL-DL configuration.

Therefore, a need exists for a method for transmitting a physical channel in a TDD communication system capable of carrier aggregation which supports aggregation of carriers having different TDD configurations.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a method for transmitting a Hybrid Automatic Repeat reQuest (HARQ) ACKnowledgement/Non-ACKnowledgement (ACK/NACK) in an uplink subframe of a Primary Cell (PCell). In order to address this issue, there is a need to define the downlink subframes corresponding to the uplink subframe carrying the HARQ ACK/NACK. In addition, there is a need of a method for transmitting the HARQ ACK/NACK using a Physical Uplink Control Channel (PUCCH) format 1b with channel selection. Accordingly, another aspect of the present invention proposes a mobile communication system and a method for transmitting/receiving channels in the mobile communication system.

In accordance with an aspect of the present invention, a communication method of a terminal in a Time Division Duplex (TDD) radio communication system accomplishing broadband through carrier aggregation of primary and secondary cells of which aggregated carriers have different TDD Uplink-Downlink (UL-DL) configurations is provided. The system includes receiving a Physical Downlink Shared CHannel (PDSCH) through the secondary cell, and transmitting acknowledgement information corresponding to the PDSCH to a base station, wherein the acknowledgement information is transmitted on a PUCCH of the primary cell.

In accordance with another aspect of the present invention, a communication method of a terminal in a TDD radio communication system accomplishing broadband through carrier aggregation of primary and secondary cells of which aggregated carriers have different TDD UL-DL configurations is provided. The method includes PDSCHs through the primary and secondary cells respectively, and transmitting acknowledgement information corresponding to the PDSCHs to a base station, wherein the transmitting of the acknowledgement information comprises mapping the received acknowledgements corresponding to the PDSCHs to a predefined table in a predefined order, and transmitting data including the mapping information.

In accordance with another aspect of the present invention, a terminal operating in a TDD radio communication system accomplishing broadband through carrier aggregation of primary and secondary cells of which aggregated carriers have different TDD UL-DL configurations is provided. The terminal includes a receiver which receives a PDSCH through the secondary cell, a transmitter which transmits acknowledgement information corresponding to the PDSCH to abuse station, and a controller which controls the transmitter to transmit the acknowledgement information on a PUCCH of the primary cell.

In accordance with another aspect of the present invention, a terminal operating in a TDD radio communication system accomplishing broadband through carrier aggregation of primary and secondary cells of which aggregated carriers have different TDD UL-DL configurations is provided. The terminal includes a receiver which receives PDSCHs through the primary and secondary cells respectively, a transmitter which transmits acknowledgement information corresponding to the PDSCHs to a base station, and a controller which maps the received acknowledgements corresponding to the PDSCHs to a predefined table in a predefined order and controls the transmitter to transmit data including the mapping information.

In accordance with another aspect of the present invention, a channel transmission method of a terminal is provided. The method includes receiving a PDSCH at subframes of a secondary cell, selecting uplink subframes for transmitting HARQ ACK/NACK corresponding to the PDSCH in a PCell, and transmitting the HARQ ACK/NACK at the selected subframes.

In accordance another aspect of the present invention, a channel transmission method of a terminal is provided. The method includes selecting downlink subframes of primary and secondary cells that are mapped to uplink subframes selected for HARQ ACK/NACK transmission, selecting a transmission format and a transmission table according to a number of selected downlink frames, determining a HARQ ACK/NACK of selected downlink subframes, mapping the determined HARQ ACK/NACK in the selected transmission format and transmission table, and transmitting related information.

In accordance with another aspect of the present invention, a channel reception method of a base station is provided. The method includes transmitting a. PDSCH in a secondary cell, determining subframes of a primary cell for receiving a HARQ ACK/NACK corresponding to the PDSCH, and receiving the HARQ ACK/NACK from a terminal using information transmitted through a transmission format and a transmission table selected according to numbers of downlink subframes of the primary and secondary cells that are mapped to the determined subframes.

In accordance with another aspect of the present invention, a channel transmission terminal is provided. The terminal includes a receiver which receives a PDSCH through subframes of a secondary cell, a controller which controls selection of uplink subframes of a primary cells for transmitting HARQ ACK/NACK corresponding to the received PDSCH, controls selection of a transmission format and a transmission table according to numbers of downlink subframes of the primary and secondary cells that are mapped to the uplink subframes, determines HARQ ACK/NACK of the selected downlink subframes, maps the determined HARQ ACK/NACK to the selected transmission format and transmission table, and transmits related information, and a transmitter which transmits the HARQ ACK/NACK under the control of the controller.

In accordance with still another aspect of the present invention, a channel transmission base station is provided. The base station includes a transmitter which transmits a PDSCH at subframes of a secondary cell, a controller which controls selection of uplink subframes of a primary cell for transmitting HARQ ACK/NACK corresponding to the physical downlink shared channel, controls selection of a transmission format and a transmission table according to numbers of downlink subframes of the primary and the secondary cells that are mapped to the uplink subframes, determines HARQ ACK/NACK of the selected downlink subframe, maps the determined HARQ ACK/NACK in the selected transmission formation and transmission table, and receives related information, and a receiver which receives the HARQ ACK/NACK from the terminal under the control of the controller.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

DETAILED DESCRIPTION OF EXEMPLARY EMBODIMENTS

Figure 1:
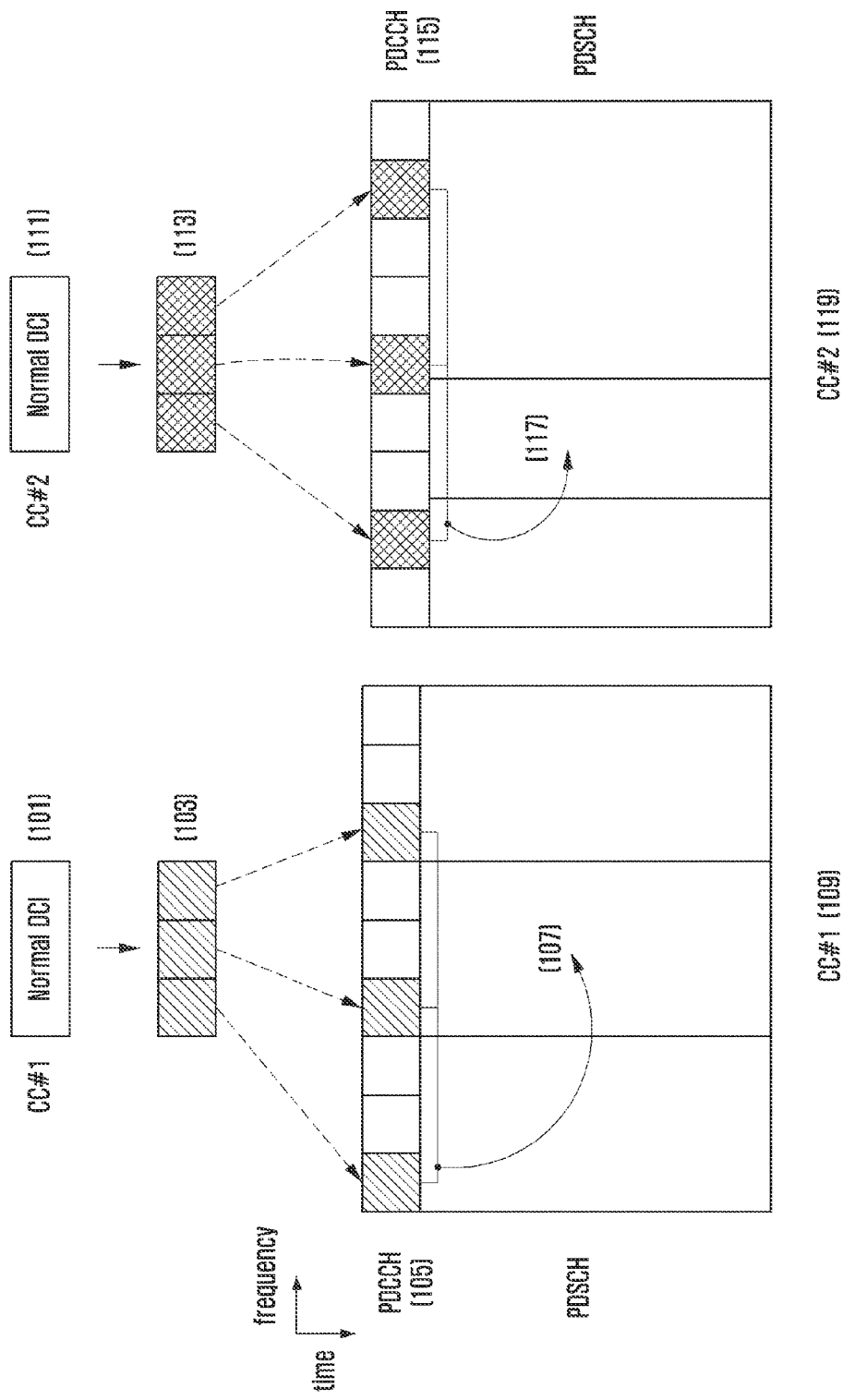
FIG. 1 illustrates a self-scheduling scheme according to the related art.
Figure 2:
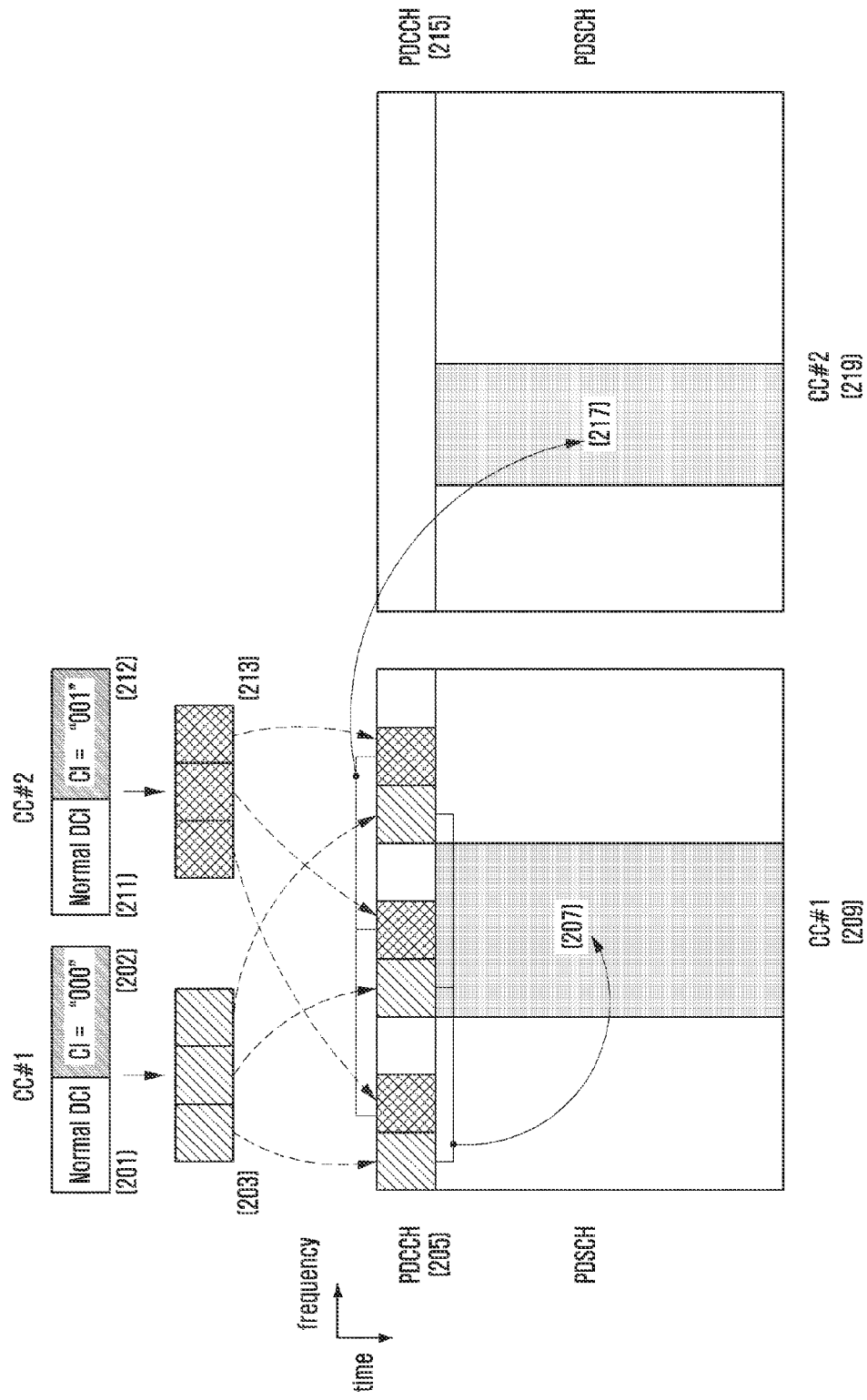
FIG. 2 illustrates a cross-carrier scheduling scheme according to the related art.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, description of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Although exemplary embodiments of the present invention are directed to a Long Term Evolution-Advanced (LTE-A) system supporting carrier aggregation, it will be understood by those skilled in the art that the subject matter of the present invention can be applied to other communication systems having similar technical background and channel format, with a slight modification, without departing from the spirit and scope of the invention. For example, the subject matter of the present invention can be applied to the multi-carrier High Speed Packet Access (HSPA) supporting carrier aggregation.

An exemplary embodiment of the present invention proposes a method for transmitting a Physical Downlink Shared CHannel (PDSCH) transmission in a Secondary Cell (SCell) and uplink Hybrid Automatic Repeat reQuest (HARQ) ACKnowledgement/Non-ACKnowledgement (ACK/NACK) transmission in a Primary Cell (PCell) in a case where a Time Division Duplex (TDD) Uplink-Downlink (UL-DL) configurations of the aggregated carriers differ from each other in the TDD radio communication system achieving broadband data rate through carrier aggregation.

In the TDD LTE system, the timing relationship between PDSCH and a Physical Uplink Control CHannel (PUCCH) or a Physical Uplink Shared CHannel (PUSCH) carrying uplink HARQ ACK/NACK corresponding to the PDSCH is described below.

A User Equipment (UE) is capable of receiving the PDSCH transmitted by an evolved Node B (eNB) at $(n-k)^{th}$ subframe and transmitting uplink HARQ ACK/NACK corresponding to the received PDSCH at $n^{th}$ subframe. Here, k denotes an element of a set K, and K can be proposed as shown in Table 2.

TABLE 2

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

In Table 2, n may indicate an uplink subframe index, and the value determined according to the TDD UL-DL configuration with the subframe n is an index of downlink subframe corresponding to the uplink subframe.

For example, in Table 2, the uplink subframe index in TDD UL-DL configuration #1 can be one of #2, #3, #7, and #8 according to the subframe n. At this time, the uplink subframe #2 carries the HARQ ACK/NACK corresponding to the $7^{th}$ and $6^{th}$ subframes counted back from the uplink subframe #2. For example, the uplink subframe #2 carries the HARQ ACK/NACK corresponding to two downlink subframes. In addition, the uplink subframe #3 carries the HARQ ACK/NACK corresponding to the $4^{th}$ subframe counted back from the uplink subframe #3. For example, the uplink subframe #3 carries the HARQ ACK/NACK corresponding to one downlink subframe. The number of DL subframes for which a specific uplink subframe has to carry HARQ ACK/NACK can be determined by referencing Table 2 and denoted by M.

Figure 3:
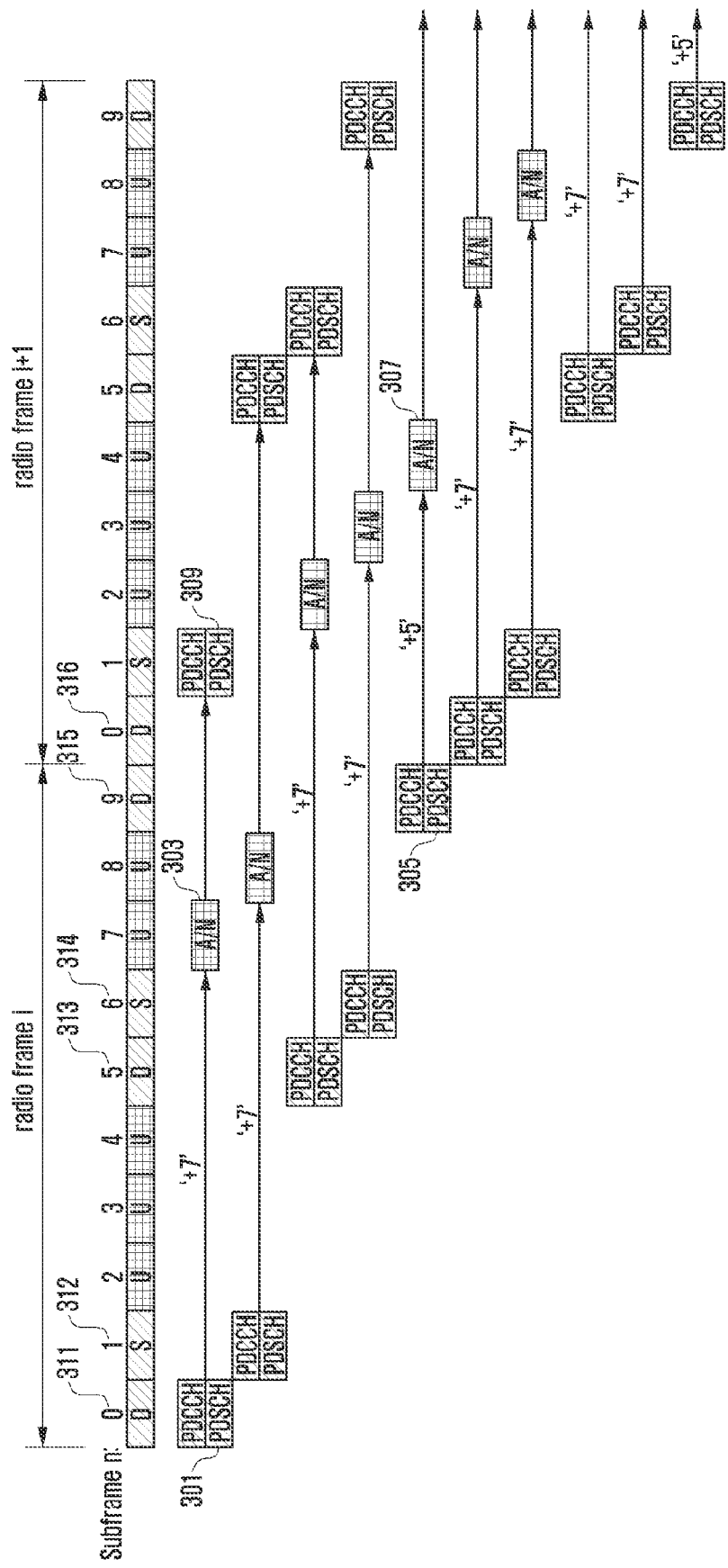
FIG. 3 illustrates a method fir transmitting uplink a Hybrid Automatic Repeat reQuest (HARQ) ACKnowledgement/Non-ACKnowledgement (ACK/NACK) according to an exemplary embodiment of the present invention.

FIG. 3 illustrates a method for transmitting uplink HARQ ACK/NACK according to an exemplary embodiment of the present invention.

Referring to FIG. 3, subframe n comprising radio frame i and radio frame i+1. Subframes 0, 1, 5, 6, and 7 of radio frame i are indicated by reference numbers 311, 312, 313, 314, and 315. Subframe 0 of radio frame is indicated by reference number 316. In the exemplary case of TDD UL-DL configuration #6, if PDSCH is transmitted in a downlink or a special subframe, which subframe carries the uplink HARQ ACK/NACK corresponding to the PDSCH is determined as defined in Table 2.

In an exemplary embodiment of the present invention, the UE transmits uplink HARQ ACK/NACK 303 corresponding to a PDSCH 301, which has been transmitted by the eNB at subframe #0 3111 of the radio frame i, at subframe #7 of the radio frame i. At this time, the Downlink Control Information (DCI) including scheduling information of the PDSCH 301 is transmitted on the Physical Downlink Control Channel (PDCCH) 309 of the same subframe carrying the PDSCH 301.

In an exemplary embodiment of the present invention, the UE transmits uplink ACK/NACK 307 corresponding to a PDSCH 305, which has been transmitted by the eNB at subframe #9 315 of radio frame i, at the subframe #4 of the radio frame i+1. Similarly, the DCI including the scheduling information of the PDSCH 305 is transmitted on the PDCCH of the same subframe carrying the PDSCH 305.

In the LTE-A system supporting carrier aggregation, if the aggregated carriers are not on the consecutive frequency bands, the TDD UL-DL configuration can be configured differently according to the system management scenario. In an exemplary case that the eNB operates with two cells, the first cell may operate in uplink/downlink symmetrical subframe distribution, while the second cell may operate with downlink-heavy asymmetrical subframe distribution. In another exemplary case, the first cell operates with the TDD UL-DL configuration capable of maintaining the compatibility with Time Division-Synchronous Code Division Multiple Access (TD-SCDMA) by taking notice that the compatibility with the TD-SCDMA as legacy $3^{rd}$ Generation (3G) TDD system. In this way, it is possible to avoid the interference between the TD-SCDMA and LTE TDD systems. The second cell may operate with the TDD UL-DL configuration based on the traffic load without extra restriction.

Definition of K and M

K denotes a set of downlink subframes for which the HARQ ACK/NACK has to be transmitted in an uplink subframe according to the UL-DL configuration of the cell as shown in Table 2, and M denotes a number of elements of the set. Table 2 is applicable to a case where the cells have the same UL-DL configuration. Accordingly, the downlink subframes of the PCell of which specific uplink subframes carrying the HARQ ACK/NACK are always identical with the downlink subframes of the SCell.

In a case where the cells operate with different UL-DL configurations, however, the K and M for the PCell at a specific uplink subframe of the PCell has to be different from the K and M of the SCell. An exemplary embodiment of the present invention proposes the Ks and Ms of the respective cells as described below.

K and M for the PCell are referred to as K1 and M1, and the set of subframes as the elements of the set K defined in Table 2 according to the UL-DL configuration of the PCell is K1, and the number of elements is M1. For example, the set K defined at the uplink subframe #2 in the UL-DL configuration #3 of the PCell is {7, 6, 11} as shown in Table 2 and this corresponds to the downlink subframes #5, #6, and #1. Accordingly, K1={5, 6, 1} and M1=3.

Thereafter, K and M for the SCell are referred to as K2 and M2. If there are plural SCells, the K and M indices are assigned in an ascending order of the serving cell index. For example, if there are two SCells, the K and M are assigned in an ascending order of K2 and M2 and K3 and M3. Although the description is directed to the case where there is one SCell with K2 and M2, exemplary embodiments of the present invention can be applied to the case where there are two or more SCells with K2, M2, K3, M3, and the like.

The K2 and M2 of the SCell can be defined differently according to the HARQ ACK/NACK timing rule in an uplink subframe of the PCell in correspondence to the PDSCH transmission in the SCell as described below.

A first exemplary embodiment is directed to the case of following the rule specifying HARQ ACK/NACK transmission at the uplink subframes of HARQ ACK/NACK transmission timings defined at the downlink subframe of the PCell at the same location as the downlink subframes carrying the PDSCH of the SCell according to the UL-DL configuration of the PCell for the PDSCH transmission of the downlink subframe of the SCell. This rule can be applied to the case where the downlink subframes of the UL-DL configuration of the PCell includes the downlink subframes of the UL-DL configuration of the SCell, or the downlink subframes of the PCell UL-DL configuration and the downlink subframes of the SCell UL-DL configuration have no inclusion relationship. A set of subframes corresponding to the elements of downlink subframes of the SCell at PCell subframe position corresponding to the elements of the set K defined in Table 2 according to the UL-DL configuration is defined as K2 and the number of elements as M2. In the cases of the UL-DL configuration #3 of the PCell and the UL-DL configuration #4 of the SCell, if the HARQ ACK/NACK is transmitted at the uplink subframe #2 of the PCell the set defined in Table 2 according to the UL-DL configuration of the PCell is {7, 6, 11}, the elements are subframes #5, #6, and #1, and the subframes of the SCell at the corresponding subframe positions are all downlink subframes, and thus, K2={5, 6, 1} and M2=3 for the SCell.

A second exemplary embodiment is directed to the case of following the rule specifying the HARQ ACK/NACK transmission at the PCell uplink subframes according to the HARQ ACK/NACK transmission timings of the SCell UL-DL configuration in correspondence to the PDSCH transmission at the SCell downlink subframes. This rule can be applied to the case where the uplink subframes of the PCell UL-DL configuration the uplink subframes of the SCell UL-DL configuration. At this time, the set of the subframes corresponding to the elements of the set K defined in Table 2 according to the SCell UL-DL configuration is defined as K2, and the number of elements is defined as M2. For example, the set K defined at the uplink subframe #3 of the SCell UL-DL configuration #1 is {4} as defined in Table 2, and the element corresponds to subframe #9. Accordingly, K2={9} and M2=1 for the SCell.

A third exemplary, embodiment is directed to the case of following the rule specifying HARQ ACK/NACK transmission at the PCell uplink subframes according to the HARQ ACK/NACK transmission timings of the UL-DL configuration #4 or #5 in correspondence to the PDSCH transmission at the SCell downlink subframes. The rule can be applied when the downlink subframes of the PCell UL-DL configuration and the downlink subframes of the SCell UL-DL configuration have no inclusion relationship. At this time, a set of subframes corresponding to the elements as the downlink subframes of the SCell at the subframe positions corresponding to the elements of the set K defined in Table 2 according to the UL-DL configuration #4 or #5 is defined as K2, and the number of elements is defined as M2. In the cases of PCell UL-DL configuration #1 and SCell UL-DL configuration #3, if the HARQ ACK/NACK is transmitted according to the HARQ ACK/NACK transmission timing defined according to UL-DL configuration #4 at the PCell uplink subframe #3, the set K defined in Table 2 according to the UL-DL configuration #4 is {6, 5, 4, 7}, these elements correspond to the subframes #7, #8, #9, and #6, and the SCell is downlink at these subframe positions. Accordingly, K2={7, 8, 9, 6} and M2=4 for the SCell.

A fourth exemplary embodiment is directed to the case of following the rule specifying HARQ ACK/NACK transmission, in association with the PDSCH transmission at the SCell downlink subframe, at the PCell uplink subframes according to the HARQ ACK/NACK transmission timing defined at the PCell downlink subframes in the PCell UL-DL configuration in a case where the PCell subframe is the downlink subframe and according to the HARQ ACK/NACK transmission timings defined in the SCell UL-DL configuration in a case where the PCell subframe is the uplink subframe. This rule can be applied to the case where the uplink subframes of the PCell UL-DL configuration include the uplink subframes of the SCell UL-DL configuration. A set of the subframes corresponding to the elements as the SCell downlink subframes at the PCell subframe positions corresponding to the elements of the set K defined in Table 2 according to the PCell UL-DL configuration and the subframes corresponding to the elements as the PCell uplink subframes among the elements of the set K defined in Table 2 according to the SCell UL-DL configuration is defined as K2, and the number of elements is defined as M2. In the case of PCell UL-DL configuration #1 and SCell UL-DL configuration #2, if the HARQ ACK/NACK is transmitted at PCell uplink subframe #2, the set K defined in Table 2 according to the PCell UL-DL configuration is {7, 6}, these elements correspond to #5 and #6, and the SCell subframes at the subframe positions are all downlink subframes. In addition, the set K defined in Table 2 according to the SCell, UL-DL configuration is {8, 7, 4, 6}, these elements correspond to subframe #4, #5, #8 and #6, and the PCell uplink subframe at the subframe position is #8. Accordingly, K2={5, 6, 8} and M2=3 for the SCell.

A fifth exemplary embodiment is directed to the case of following the rule specifying HARQ ACK/NACK transmission, in association with the PDSCH transmission at the SCell downlink subframe, at the PCell uplink subframes according to the HARQ ACK/NACK transmission timing defined at the PCell downlink subframes of the PCell UL-DL configuration when the PCell subframe is downlink subframe and HARQ transmission at the PCell uplink subframes according to the HARQ ACK/NACK transmission timing of the UL-DL configuration #4 or #5 when the PCell subframe is an uplink subframe. The rule can be applied to the case where the downlink subframes of the PCell UL-DL configuration and the downlink subframes of the SCell UL-DL configuration have no inclusion relationship. At this time, a set of the subframes corresponding to the elements as the SCell downlink subframes at the PCell subframe positions corresponding to the element of the set K defined in Table 2 according to the PCell UL-DL configuration and the subframes as SCell downlink subframes and the PCell uplink subframes among the elements of the set K defined in Table 2 according to the UL-DL configuration #4 or #5 is defined as K2, and the number of elements is defined as M2. In the case of PCell UL-DL configuration #1 and SCell UL-DL configuration #2, if the HARQ ACK/NACK is transmitted at the uplink subframe #3 of the PCell, the set K defined in Table 2 according to the PCell UL-DL configuration is {4}, this element corresponds to the subframe #9, and the SCell subframe at this subframe position is a downlink subframe. In addition, the set K defined in Table 2 according to the UL-DL configuration #4 is {6, 5, 4, 7}, these element correspond to subframes #7, #8, #9, and #6, SCell is downlink at these subframe positions, and PCell is uplink at subframes #7 and #8. Accordingly, K2={7, 8, 9} and M2=3 for the SCell.

A sixth exemplary embodiment is directed to the case of following the rule of transmitting HARQ ACK/NACK at the PCell uplink subframe at the HARQ ACK/NACK transmission timing defined in the reference UL-DL configuration for PDSCH transmission at the SCell downlink subframe. The reference UL-DL configuration can be determined one by one according to the UL-DL configurations of the PCell and SCell. This rule can be applied regardless of inclusion relationship between the downlink subframes of the PCell UL-DL configuration and the SCell UL-DL configuration. At this time, a set of elements corresponding to the SCell subframes at which the PDSCH can be scheduled or transmitted at the subframe positions corresponding to the elements of the set K defined in Table 2 according to the reference UL-DL configuration is defined as K2, and the number of elements is defined as M2. Here, if an SCell subframe is the subframe at which the PDSCH can be scheduled or transmitted, its meaning can be interpreted differently in cross carrier scheduling and self-scheduling. In the case of self-scheduling, this means that the SCell subframe at the subframe position corresponding to the element of the set K defined in Table 2 according to the reference UL-DL configuration is the downlink subframe. If the cross-carrier scheduling is allowed when both the PCell subframe and the SCell subframe are downlink subframes, this means that both the PCell and SCell subframes are downlink subframes at the subframe position corresponding to the elements of the set K. For example, in a case where the PCell and SCell UL-DL configurations are UL-DL, configurations #1 and #3 respectively and the reference UL-DL, configuration is UL-DL configuration #4, if the HARQ ACK/NACK is transmitted at the PCell's subframe #3 according to the HARQ ACK/NACK transmission timing defined according to the UL-DL configuration #4, the set K defined in Table 2 according to the UL-DL configuration #4 is {6, 5, 4, 7} in which the elements corresponds to subframes #7, #8, #9, and #6. Considering the self-scheduling first, since the SCell subframes at the subframe positions are all downlink subframes, K2={7, 8, 9, 6} and M2=4 for SCell. Meanwhile, if K2 is expressed as a relative value as defined in K rather than an absolute subframe position, it can be expressed as K2{6, 5, 4, 7}. Considering the cross-carrier scheduling, since both the PCell and SCell subframes are downlink subframes at the subframe position #9 and #6, K2={9, 6} and M2=2 for the SCell. Meanwhile, if K2 is expressed as a relative value as defined in K rather than an absolute subframe position, it can be expressed as K2={4, 7}.

A seventh exemplary embodiment is directed to the case of following the rule of transmitting, when the PDSCH carried by the downlink subframe of SCell-2 is cross-carrier scheduled by PDCCH transmitted in another SCell-1, the HARQ ACK/NACK at the PCell uplink subframe at the HARQ ACK/NACK transmission timing defined for the PDSCH of the SCell-2 according to the reference UL-DL configuration. The reference UL-DL configuration can be determined in consideration of the UL-DL configurations of the PCell and the SCell-2 or the UL-DL configurations of the PCell and the SCell-1. At this time, the set of elements corresponding to the subframes of SCell-2 in which PDSCH can be scheduled or transmitted at the subframe position corresponding to the elements of the set K defined in Table 2 according to the reference UL-DL configuration is defined as K2 and the number of elements is defined as M2. Here, if the SCell-2 subframe is the subframe capable or scheduling or transmitting PDSCH, this means that if the cross-carrier scheduling is allowed when both the SCell-1 and SCell 2 are at downlink subframe timing, both the SCell-1 subframe and SCell-2 subframe are downlink subframes at the subframe positions corresponding to the elements of the set K. A description is made of the case where the reference UL-DL configuration of the SCell-2 in consideration of the UL-DL configuration of the PCell and SCell-2. In the case of PCell with UL-DL configuration #2, SCell-1 with UL-DL configuration #3, and SCell-2 with UL-DL configuration #6 and reference UL-DL configuration #2, when transmitting the HARQ ACK/NACK according to the HARQ ACK/NACK transmission timing defined according to the UL-DL configuration #2 at the PCell uplink subframe #2, the set K defined in Table 2 according to the UL-DL configuration #2 is {8, 7, 4, 6}, and the elements correspond to #4, #5, #8, and #6. The subframe positions at which both the SCell-1 and SCell-2 subframes are downlink subframes are subframes #5 and #6 such that K2={5, 6} and M2=2 for the SCell-2. Meanwhile, in the case of expressing K2 as a relative value as defined K rather than an absolute subframe position, it can be expressed as K2={7, 6}. Hereinafter, a description is made of the case where the reference UL-DL configuration of the SCell-2 is determined in consideration of the PCell and SCell-1 UL-DL configurations. In the case of the PCell with UL-DL configuration #2, the SCell-1 with UL-DL configuration #3, and the SCell-2 with UL-DL configuration #6 and reference UL-DL configuration #5, when the HARQ ACK/NACK is transmitted according to the HARQ ACK/NACK transmission timing defined according to the UL-DL configuration #5 at the uplink subframe #2 of the PCell, the set K defined in Table 2 according to the UL-DL configuration is {13, 12, 9, 8, 7, 5, 4, 11, 6} which correspond to the subframes #9, #0, #3, #4, #5, #7, #8, #1, and #6. The subframe positions where both the SCell-1 and SCell-2 subframes are downlink are subframes #9, #0, #5, #1, and #6 such that K2={9, 0, 5, 1, 6} and M2=5 for the SCell-2. Meanwhile, in the case of expressing K2 as a relative value as defined in K rather than an absolute subframe position, it can be expressed as K2={13, 12, 7, 11, 6}.

Classification of Format 1b with Channel Selection According to M

The format 1b with channel selection is used for transmitting HARQ ACK/NACK in a case where two cells are configured. The format 1b with channel selection identifies HARQ ACK/NACK input to be transmitted based on Quadrature Phase Shift Keying (QPSK) symbol position and PUCCH transmission resource.

The application of the format 1b with channel selection can be classified into the following cases according to the M defined per cell in an exemplary embodiment of the present invention: a case of transmission of up to two HARQ ACK/NACK, a case of transmission of up to 4 HARQ ACK/NACK without application of any bundling for HARQ ACK/NACK, case of transmission up to 4 HARQ ACK/NACK by applying spatial bundling to two HARQ ACK/NACK per downlink subframe, when up to 8 HARQ ACK/NACK has to be transmitted, and a case of transmission of over 4 HARQ ACK/NACK even when the spatial bundling is applied to 2 HARQ ACK/NACK per downlink subframe. Descriptions are made of the respective cases.

1. A Case of transmitting up to 2 HARQ ACK/NACK

This is a case of M1+M2=1 where M1=0 and M2=1 or M1=1 and M2=0. For example, if M1=1 and M2=0, HARQ ACK/NACK corresponding to 1 PCell downlink subframe is transmitted at a PCell uplink subframe while no HARQ ACK/NACK corresponding to SCell downlink subframe is transmitted. At this time, since up to 2 HARQ ACK/NACK can be transmitted according to the transmission mode of the PCell, it is possible to transmit HARQ ACK/NACK without loss of information on the HARQ ACK/NACK using the format 1a or format 1b. If it is determined to use the format 1b with channel selection, taking the risk of information toss, in transmitting HARQ ACK/NACK, it is possible to use the table defined for format 1b with channel selection in a case of the M1=1 and M2=1 other than M1=1 and M2=0. At this time, it is not necessary to transmit HARQ ACK/NACK corresponding to the SCell downlink subframe, the HARQ ACK/NACK information corresponding to the SCell downlink subframe is determined as a Distributed Transmission System (DTs) value and the HARQ ACK/NACK information corresponding to the PCell downlink subframe is determined as the value intended by the UE, the determined values being able to map to the corresponding elements in the table. Although the description has been directed to the case of processing HARQ ACK/NACK as a Discontinuous Transmission (DTX) when there is no need of HARQ ACK/NACK transmission at downlink subframe, it is also possible to replace DTX with ACK.

In addition, when there is the PDCCH received at a PCell downlink subframe, the PUCCH transmission resource is determined based on a Control Channel Element (CCE) value of PDCCH and, if no PDCCH exists, a value received through higher layer signaling.

2. A Case of Transmitting Up to 4 HARQ ACK/NACK without Application of any Bundling to HARQ ACK/NACK.

This is a case of M1+M2=2, i.e., M1=0 and M2=2 or M1=1 and M2=1 or M1=2 and M2=0. For example, if M1=0 and M2=2 and if HARQ ACK/NACK is transmitted at a PCell uplink subframe, this is the case where the HARQ ACK/NACK corresponding to the 2 SCell downlink subframes but not HARQ ACK/NACK corresponding to any PCell downlink subframe. At this time, since the number of HARQ ACK/NACK to be transmitted is 2 or 4 depending on the transmission mode of the SCell, it is possible to use the format 1b with channel selection. At this time, a mapping order of the HARQ ACK/NACK to Transport Block (TB) at each subframe has to be determined. The mapping order is determined as follows. First, a cell having more TBs to be mapped is selected between PCell and SCell. If the numbers of the TBs to be transmitted in the PCell and SCell are equal to each other, the PCell has the priority. The TBs of the first downlink subframe of the selected cell are mapped first and the TBs of the next downlink subframe are mapped. Until there is no downlink subframe for mapping, the mapping ends. If there is no TB to be mapped in the cell, the mapping ends. If there is further TB to be mapped in the cell, the TBs are mapped to the first downlink subframe of the cell and the TB mapping is continued at the next downlink subframe.

Accordingly, the HARQ ACK/NACK mapping order based on M1 and M2 is summarized as shown in Table 3.

TABLE 3

| | | | HARQ-ACK(j) | | | |
|---|---|---|---|---|---|---|
| $M_1$ | $M_2$ | A | HARQ-ACK(0) | HARQ-ACK(1) | HARQ-ACK(2) | HARQ-ACK(3) |
| 0 | 2 | 2 | TB1 First subframe of Secondary cell | TB1 Second subframe of Secondary cell | NA | NA |
| 0 | 2 | 4 | TB1 First subframe of Secondary cell | TB2 First subframe of Secondary cell | TB1 Second subframe of Secondary cell | TB2 Second subframe of Secondary cell |

TABLE 3-continued

| $M_1$ | $M_2$ | A | HARQ-ACK(0) | HARQ-ACK(1) | HARQ-ACK(2) | HARQ-ACK(3) |
|---|---|---|---|---|---|---|
| 1 | 1 | 2 | TB1 Primary cell | TB1 Secondary cell | NA | NA |
| 1 | 1 | 3 | TB1 Serving cell1 | TB2 Serving cell1 | TB1 Serving cell2 | NA |
| 1 | 1 | 4 | TB1 Primary cell | TB2 Primary cell | TB1 Secondary cell | TB2 Secondary cell |
| 2 | 0 | 2 | TB1 First subframe of Primary cell | TB1 Second subframe of Primary cell | NA | NA |
| 2 | 0 | 3 | TB1 First subframe of Primary cell | TB2 First subframe of Primary cell | TB1 Second subframe of Primary cell | TB2 Second subframe of Primary cell |

In Table 3, A denotes a number of PUCCH transmission resources required for transmission with the format 1b with channel selection, and one of the tables for the format 1b with channel selection for M1+M2=2 is determined to be applied.

Tables 4, 5, and 6 provided below are the "format 1b with channel selection" tables according to the value of A.

Table 4 shows the "format 1b with channel selection" table for A=2.

TABLE 4

| HARQ-ACK(0), HARQ-ACK(1) | $n^{(1)}_{PUCCH}$ | b(0)b(1) |
|---|---|---|
| ACK, ACK | $n^{(1)}_{PUCCH,1}$ | 1, 0 |
| ACK, NACK/DTX | $n^{(1)}_{PUCCH,0}$ | 1, 1 |
| NACK/DTX, ACK | $n^{(1)}_{PUCCH,1}$ | 0, 1 |
| NACK, NACK/DTX | $n^{(1)}_{PUCCH,0}$ | 0, 0 |
| DTX, NACK/DTX | No Transmission | |

Table 5 shows the "format 1b with channel selection" table for A=3.

TABLE 5

| HARQ-ACK(0), HARQ-ACK(1), HARQ-ACK(2) | $n^{(1)}_{PUCCH}$ | b(0)b(1) |
|---|---|---|
| ACK, ACK, ACK | $n^{(1)}_{PUCCH,2}$ | 1, 1 |
| ACK, ACK, NACK/DTX | $n^{(1)}_{PUCCH,1}$ | 1, 0 |
| ACK, NACK/DTX, ACK | $n^{(1)}_{PUCCH,2}$ | 1, 0 |
| ACK, NACK/DTX, NACK/DTX | $n^{(1)}_{PUCCH,0}$ | 1, 1 |
| NACK/DTX, ACK, ACK | $n^{(1)}_{PUCCH,2}$ | 0, 1 |
| NACK/DTX, ACK, NACK/DTX | $n^{(1)}_{PUCCH,1}$ | 0, 1 |
| NACK/DTX, NACK/DTX, ACK | $n^{(1)}_{PUCCH,2}$ | 0, 0 |
| NACK, NACK/DTX, NACK/DTX | $n^{(1)}_{PUCCH,0}$ | 0, 0 |
| DTX, NACK/DTX, NACK/DTX | No Transmission | |

Table 6 shows the "format 1b with channel selection" table for A=4.

TABLE 6

| HARQ-ACK(0), HARQ-ACK(1), HARQ-ACK(2), HARQ-ACK(3) | $n^{(1)}_{PUCCH}$ | b(0)b(1) |
|---|---|---|
| ACK, ACK, ACK, ACK | $n^{(1)}_{PUCCH,1}$ | 1, 1 |
| ACK, ACK, ACK, NACK/DTX | $n^{(1)}_{PUCCH,2}$ | 1, 1 |
| ACK, ACK, NACK/DTX, ACK | $n^{(1)}_{PUCCH,0}$ | 1, 0 |
| ACK, ACK, NACK/DTX, NACK/DTX | $n^{(1)}_{PUCCH,1}$ | 1, 0 |
| ACK, NACK/DTX, ACK, ACK | $n^{(1)}_{PUCCH,3}$ | 1, 1 |
| ACK, NACK/DTX, ACK, NACK/DTX | $n^{(1)}_{PUCCH,2}$ | 1, 0 |
| ACK, NACK/DTX, NACK/DTX, ACK | $n^{(1)}_{PUCCH,0}$ | 0, 1 |
| ACK, NACK/DTX, NACK/DTX, NACK/DTX | $n^{(1)}_{PUCCH,0}$ | 1, 1 |
| NACK/DTX, ACK, ACK, ACK | $n^{(1)}_{PUCCH,1}$ | 0, 0 |

TABLE 6-continued

| HARQ-ACK(0), HARQ-ACK(1), HARQ-ACK(2), HARQ-ACK(3) | $n^{(1)}_{PUCCH}$ | b(0)b(1) |
|---|---|---|
| NACK/DTX, ACK, ACK, NACK/DTX | $n^{(1)}_{PUCCH,2}$ | 0, 1 |
| NACK/DTX, ACK, NACK/DTX, ACK | $n^{(1)}_{PUCCH,3}$ | 1, 0 |
| NACK/DTX, ACK, NACK/DTX, NACK/DTX | $n^{(1)}_{PUCCH,1}$ | 0, 1 |
| NACK/DTX, NACK/DTX, ACK, ACK | $n^{(1)}_{PUCCH,3}$ | 0, 1 |
| NACK/DTX, NACK/DTX, ACK, NACK/DTX | $n^{(1)}_{PUCCH,2}$ | 0, 0 |
| NACK/DTX, NACK/DTX, NACK/DTX, ACK | $n^{(1)}_{PUCCH,3}$ | 0, 0 |
| NACK, NACK/DTX, NACK/DTX, NACK/DTX | $n^{(1)}_{PUCCH,0}$ | 0, 0 |
| DTX, NACK/DTX, NACK/DTX, NACK/DTX | No Transmission | |

For example, if M1=1 and M2=1, if the transmission mods of both the PCell and SCell are of 1 TB transmission, if A=2, and both the PCell TB 1 and SCell TB1 are ACK, the HARQ ACK/NACK is transmitted in the format of [b(0), b(1)=1, 0], [n(1)PUCCH=n(1)PUCCH,1]. Here, b(0) and b(1) are QPSK symbols, and n(1)PUCCH denotes PUCCH transmission resource.

When ready to take the risk of information loss, the HARQ ACK/NACK can be transmitted using the "format 1b with channel selection" table (Table 6) defined for M1=2 and M2=2 instead of M1=2 and M2=0 or M1=0 and M1=2. If M1=2 and M2=0, this means no HARQ ACK/NACK corresponding to any SCell downlink subframe and thus, the HARQ ACK/NACK corresponding to the SCell downlink subframe is set to DTX value and the HARQ ACK/NACK corresponding to the PCell downlink is to the UE's intended value, the determined values being mapped to the corresponding elements in the table. If M1=0 and M2=2, this means no HARQ ACK/NACK corresponding to the PCell downlink subframe and thus, the HARQ ACK/NACK to the PCell downlink subframe is set to DTX value and the HARQ ACK/NACK corresponding to the SCell downlink subframe is set to the UE's intended value, the determined values being mapped to the corresponding elements in the table. Although the description has been directed to the case of processing HARQ ACK/NACK as DTX when there is no need of HARQ ACK/NACK transmission at downlink subframe, it is also possible to replace DTX with ACK.

The PUCCH transmission resource is determined, if there is a PDCCH received in a PCell downlink subframe, based on the CCE value of the PDCCH. Otherwise, no PDCCH is received in the PCell downlink subframe through higher layer signaling. If the PCell operates in a Spatial Multiplexing (SM) transmission mode, the transmission resource is determined based on CCE and CCE+1 of PDCCH. If there is PDCCH received in a SCell downlink subframe, the transmission resource is determined based on the Transport Power Control (TPC) of the PDCCH, and the PUCCH resource corresponding to each TPC value is received through higher layer signal. If the transmission mode of the SCell is SM, one TPC determines two resources, and the values are received through higher layer signaling.

1. Transmission of Up to 4 HARQ ACK/NACK Through Bundling of 2 HARQ ACK/NACK Per DL Subframe when Up to 8 HARQ ACK/NACK Transmission is Required.

This is a case of M1+M2=3 or M1+M2=4. The case of M1+M2=3 includes M1=0 and M2=3, M1=1 and M2=2, M1=3 and M2=3, and M1=3 and M2=0, and the case of M1+M2=4 includes M1=0 and M2=4, M1=1 and M2=3, M1=2 and M2=2, M1=3 and M2=1, and M1=4 and M2=0. In these cases, the HARQ ACK/NACK corresponding to up to 4 downlink subframes have to be transmitted in the PCell according to the values of M1 and M2. According to the transmission modes of respective cells, the HARQ ACK/NACK corresponding to up to 8 TBs may be transmitted. However, if the spatial bundling is applied to the HARQ ACK/NACK per downlink subframe carrying HARQ ACK/NACK in each cell, it is possible to reduce the information amount by as much as up to 4 HARQ ACK/NACK with the application of the format 1b with channel selection by selecting the "format 1b with channel selection" table for A=3 in the case of M1+M2=3 or A=4 in the case of M1+M2=4.

In order to apply the format 1b with channel selection, the mapping order of the HARQ ACK/NACK corresponding to the per-cell subframes needs to be determined.

The mapping order according to the first exemplary embodiment is determined as follows. First, a cell having more subframes for use in mapping is selected between PCell and SCell. If the numbers of subframes of cells to be used for mapping are equal to each other, the PCell has the priority. The downlink subframes of the selected cell are mapped in an order. If there is no subframe of the cell to map, the mapping ends. If there is further downlink subframe of the cell to be mapped, the mapping is performed from the first downlink subframe of the cell in sequence.

Accordingly, the HARQ ACK/NACK mapping orders based on M1 and M2 for M1+M2=3 and M1+M2=4 are summarized as shown in Tables 7 and 8.

TABLE 7

| | | | HARQ-ACK(j) | | | |
|---|---|---|---|---|---|---|
| $M_1$ | $M_2$ | A | HARQ-ACK(0) | HARQ-ACK(1) | HARQ-ACK(2) | HARQ-ACK(3) |
| 0 | 3 | 3 | The first subframe of Secondary cell | The second subframe of Secondary cell | The third subframe of Secondary cell | NA |
| 1 | 2 | 3 | The first subframe of Serving cell1 | The second subframe of Serving cell1 | The first subframe of Serving cell2 | NA |
| 2 | 1 | | | | | |
| 3 | 0 | 3 | The first subframe of Primary cell | The second subframe of Primary cell | The third subframe of Primary cell | NA |

TABLE 8

| | | | HARQ-ACK(j) | | | |
|---|---|---|---|---|---|---|
| $M_1$ | $M_2$ | A | HARQ-ACK(0) | HARQ-ACK(1) | HARQ-ACK(2) | HARQ-ACK(3) |
| 0 | 4 | 4 | The first subframe of Secondary cell | The second subframe of Secondary cell | The third subframe of Secondary cell | The fourth subframe of Secondary cell |
| 1 | 3 | 4 | The first subframe of Serving cell1 | The second subframe of Serving cell1 | The third subframe of Serving cell1 | The first subframe of Serving cell2 |
| 3 | 1 | | | | | |
| 2 | 2 | 4 | The first subframe of Primary cell | The first subframe of Primary cell | The first subframe of Secondary cell | The second subframe of Secondary cell |
| 4 | 0 | 4 | The first subframe of Primary cell | The second subframe of Primary cell | The third subframe of Primary cell | The fourth subframe of Primary cell |

The mapping order according to the second exemplary embodiment is determined as follows. First, the cells are selected in an ascending order of the cell index from the primary cell. If there is no further downlink subframe to be mapped, the mapping ends. If there is a further downlink subframe of the cell to be mapped, the mapping is performed in an order from the first downlink subframe, of the cell.

Accordingly, the HARQ ACK/NACK mapping orders based on M1 and M2 for M1+M2=3 and M1+M2=4 are summarized as shown in Tables 9 and 10.

TABLE 9

| | | | HARQ-ACK(j) | | | |
|---|---|---|---|---|---|---|
| $M_1$ | $M_2$ | A | HARQ-ACK(0) | HARQ-ACK(1) | HARQ-ACK(2) | HARQ-ACK(3) |
| 0 | 3 | 3 | The first subframe of Secondary cell | The second subframe of Secondary cell | The third subframe of Secondary cell | NA |
| 1 | 2 | 3 | The first subframe of Primary cell | The first subframe of Secondary cell | The second subframe of Secondary cell | NA |
| 2 | 1 | 3 | The first subframe of Primary cell | The first subframe of Primary cell | The first subframe of Secondary cell | NA |
| 3 | 0 | 3 | The first subframe of Primary cell | The second subframe of Primary cell | The third subframe of Primary cell | NA |

TABLE 10

| | | | HARQ-ACK(j) | | | |
|---|---|---|---|---|---|---|
| $M_1$ | $M_2$ | A | HARQ-ACK(0) | HARQ-ACK(1) | HARQ-ACK(2) | HARQ-ACK(3) |
| 0 | 4 | 4 | The first subframe of Secondary cell | The second subframe of Secondary cell | The third subframe of Secondary cell | The fourth subframe of Secondary cell |
| 1 | 3 | 4 | The first subframe of Primary cell | The first subframe of Secondary cell | The second subframe of Secondary cell | The third subframe of Secondary cell |
| 2 | 2 | 4 | The first subframe of Primary cell | The first subframe of Primary cell | The first subframe of Secondary cell | The second subframe of Secondary cell |
| 3 | 1 | 4 | The first subframe of Primary cell | The second subframe of Primary cell | The third subframe of Primary cell | The first subframe of Secondary cell |
| 4 | 0 | 4 | The first subframe of Primary cell | The second subframe of Primary cell | The third subframe of Primary cell | The fourth subframe of Primary cell |

The "format 1b with channel selection" table for the cases of M1+M2=3 and M1+M2=4 is determined in one of Tables 5 and 6 according to the value of A for applying the format 1b with channel selection.

When ready to take the risk of information loss in the case of M1+M2=3, the HARQ ACK/NACK can be transmitted using the "format 1b with channel selection" table defined for the case of M1=3 and M2=3 instead of M1=3 and M2=0 or M1=0 and M2=3. If M1=3 and M2=0, this means no HARQ ACK/NACK corresponding to SCell downlink subframe, the HARQ ACK/NACK information corresponding to SCell subframe is set to DTX value and HARQ ACK/NACK information corresponding to PCell downlink subframe is set to the UE's intended value, the determined values being mapped to the corresponding elements in the table. If M1=0 and M2=3, this means not HARQ ACK/NACK corresponding to the PCell downlink subframe and thus, the HARQ ACK/NACK information corresponding to the PCell downlink subframe is set to DTX value and the HARQ ACK/NACK information corresponding to the SCell downlink subframe is set to the UE's intended value, the determined values being mapped to the corresponding elements of the table. Although the description has been directed to the case of processing HARQ ACK/NACK as DTX when there is no need of HARQ ACK/NACK transmission at downlink subframe, it is also possible to replace DTX with ACK.

In the case of M1+M2=3, it is possible to use the "format 1b with channel selection" table defined for M1=2 and M2=2 instead of M1=1 and M2=2 or M1=2 and M2=1. In the case of M1=1 and M2=2 or M1=2 and M2=1, the number of HARQ ACK/NACK is less than that of the case of M2=2 and M2=2 by 1, Accordingly, the last HARQ ACK/NACK is set to DTX for use of the table defined for the case of M1=2 and M2=2 or a newly configured table. The DTX hit can be arranged at a position other than the last HARQ ACK/NACK position. Although the description has been directed to the case of processing HARQ ACK/NACK as DTX when there is no need of HARQ ACK/NACK transmission at downlink subframe, it is also possible to replace DTX with ACK.

In the case of M1+M2=4, when ready to take the risk of information loss, the HARQ ACK/NACK can be transmitted using the "format 1b with channel selection" table defined for the case of M1=4 and M2=4 instead of M1=4 and M2=0 or M1=0 and M2=4. At this time, if M1=4 and M2=0, this means no HARQ ACK/NACK corresponding to the SCell downlink subframe and thus, the HARQ ACK/NACK information corresponding to the SCell downlink subframe is set to DTX value and the HARQ ACK/NACK corresponding to the PCell downlink frame is set to the UE's intended value, these values being mapped to the corresponding elements of the table. If M1=0 and M2=4, this means no HARQ ACK/NACK corresponding to the PCell downlink subframe and thus, the HARQ ACK/NACK corresponding to the PCell downlink subframe is set to DTX value and the HARQ ACK/NACK corresponding to the SCell downlink subframe is set to the UE's intended value, these values being mapped to the corresponding elements of the table. Although the description has been directed to the case of processing HARQ ACK/NACK as DTX when there is no need of HARQ ACK/NACK transmission at downlink subframe, it is also possible to replace DTX with ACK.

In the case of M1+M2=4, the "format 1b with channel selection" table defined for the case of M1=3 and M2=3 instead of M1=1 and M2=3 or M1=3 and M2=1. As compared to the case of M1=3 and M2=3, it is shown that the number of HARQ ACK/NACK to be transmitted in the case of M1=1 and M2=3 or M1=3 and M2=1 is less than that the case of M1=3 and M2=3 by 2. Accordingly, the last two HARQ ACK/NACK information can Be Set To DTX Value To Use The Table Defined For the case of M1=3 and M2=3 or a newly configured table. The DTX bits can be arranged at other positions than the last 2 HARQ ACK/NACK positions. Although the description has been directed to the case of processing HARQ ACK/NACK as DTX when there is no need of HARQ ACK/NACK transmission at downlink subframe, it is also possible to replace DTX with ACK.

The PUCCH transmission resource can be determined, if there is PDCCH received at a PCell subframe, based on the CCE value of PDCCH or, if there is no PDCCH received at a PCell subframe, through higher layer signal. The transmission resource is determined, if there is PDCCH received at a SCell downlink subframe, based on the TPC field of the PDCCH, and the PUCCH resource corresponding to the TPC value is informed through higher layer signaling.

In the case of M1+M2=3, in order to compensate for the performance degradation predicted in using the "format 1b with channel selection" table defined for M1=2 and M2=2 instead of M1=1 and M2=2 or M1=2 and M2=1, the spatial bundling is applied to only the cell with M of large value but may not be applied to the cell with M of a small value. In the first example, if M1=1 and M2=2, this means that the PCell's M is less than the SCells M and thus, if the PCell is the cell configured with the transmission mode for transmitting HARQ ACK/NACK corresponding to the two TBs, the spatial bundling may not be applied. In the case of using the "format 1b with channel selection" table defined for M1=2 and M2=2, instead of transmitting meaningless information by processing the HARQ ACK/NACK corresponding to one downlink subframe having no transmission in the PCell as DTX or ACK, the UE transmits the HARQ ACK/NACK corresponding to the respective TBs when the HARQ ACK/NACK corresponding to one downlink subframe having transmission is transmitted, without application of the spatial bundling. In the second example, if M1=2 and M2=1, this means that the SCell's M is less than the PCell's M and thus, if the SCell is the cell configured with the transmission mode for transmitting HARQ ACK/NACK corresponding to two TBs, the spatial bundling may not be applied. In the case of using the "format 1b with channel selection" table defined for M1=2 and M2=2, instead of transmitting meaningless information by processing the HARQ ACK/NACK corresponding to one downlink subframe having no scheduled transmission in the PCell as DTX or ACK, the HARQ ACK/NACK corresponding to the respective TBs is transmitted when the HARQ ACK/NACK corresponding to one downlink subframe having scheduled transmission is transmitted, without application of the spatial bundling.

Accordingly, when M1=1 and M2=2 or M1=2 and M2=1, the "format 1b with channel selection." table defined for M1=2 and M2=2 can be used with the mapping as shown in Table 11.

TABLE 11

| | | | | HARQ-ACK(j) | | |
|---|---|---|---|---|---|---|
| $M_1$ | $M_2$ | A | HARQ-ACK(0) | HARQ-ACK(1) | HARQ-ACK(2) | HARQ-ACK(3) |
| 1 | 2 | 4 | TB1 First subframe of Primary cell | TB2 First subframe of Primary cell | The first subframe of Secondary cell | The second subframe of Secondary cell |
| 2 | 1 | 4 | The first subframe of Primary cell | The second subframe of Primary cell | TB1 First subframe of Secondary cell | TB2 First subframe of Secondary cell |

In the case of M1+M2=4, in order to compensate the performance degradation predicted in using the "format 1b with channel selection" table defined for M1=3 and M2=3 instead of M1=2 and M2=2 for the case of M1=1 and M2=3 or M1=3 and M2=1, the spatial bundling is applied to only the cell with M of large value but may not be applied to the cell with M of small value. In the first example, if M1=1 and M2=3, this means that the PCell's M is less than the SCell's M and thus, if the PCell is the cell configured with the transmission mode for transmitting HARQ ACK/NACK corresponding to the two TBs, the spatial bundling may not be applied. In the case of using the "format 1b with channel selection" table defined for M1=3 and M2=3, instead of transmitting meaningless information by processing the HARQ ACK/NACK corresponding to two downlink subframes having no transmission in the PCell as DTX or ACK, the UE, when transmitting the scheduled HARQ ACK/NACK corresponding to one downlink subframe, maps the HARQ ACK/NACK corresponding to the respective TBs and maps DTX or ACK to one remained input, without application of the spatial bundling. In the case of using the "format 1b with channel selection" table defined for M1=3 and M2=3, instead of transmitting meaningless information by processing the HARQ ACK/NACK corresponding to two downlink subframes having no transmission in the SCell as DTX or ACK, the UE, when transmitting the scheduled HARQ ACK/NACK corresponding to one downlink subframe, maps the HARQ ACK/NACK corresponding to the respective TBs and maps DTX or ACK to one remained input, without application of the spatial bundling. In addition, instead of mapping the DTX or ACK to one remained input, it is possible to map the HARQ ACK/NACK corresponding to a predefined TB.

In order to use the "format b with channel selection" table defined for M1=2 and M2=2 or M1=3 and M2=3 in the above example, four PUCCH transmission resources have to be determined and thus, if there is PDCCH received at PCell downlink subframe, the resource for the cell to which spatial bundling is not applied can be determined by the first CCE value nCCE and nCCE+1 of the PDCCH for the cell to which spatial bundling is not applied. In a case where there is PDCCH received at SCell downlink subframe, the resource for the cell to which spatial bundling is not applied is determined through the TPC field of PDCCH for the cell to Which the spatial bundling is not applied, and the PUCCH resource corresponding to the TPC value is, transmitted through higher layer signaling.

1. Transmission of Over 4 ACK/NACK Even with Application of Spatial Bundling To 2 HARQ ACK/NACK Per Downlink Frame.

This is the case of M1+M2=5, M1+M2=6, M1+M2=7, or M1+M2=8. The case of M1+M2=5 includes M1=1 and M2=4, M1=2 and M2=3, M1=3 and M2=2, and M1=4, M2=1. The case of M1+M2=6 includes M1=2 and M2=4, M1=3 and M2=3, and M1=4 and M2=2. The case of M1+M2=7 includes M1=3 and M2=4 and M1=4 and M2=3, and the case of M1+M2=8 includes M1=4 and M2=4. In these cases, the HARQ ACK/NACK corresponding to up to 8 downlink subframes has to be transmitted in the PCell according to the values of M1 and M2. At this time, the HARQ ACK/NACK corresponding to up to 16 TBs has to be transmitted according to the transmission modes of the cells and, even though the spatial bundling is applied to the HARQ ACK/NACK per downlink subframe, carrying the HARQ ACK/NACK of the cells, it is impossible to reduce the information amount to up to 4 HARQ ACK/NACK. Accordingly, it is required to apply the spatial bundling to the HARQ ACK/NACK corresponding to the downlink subframe carrying HARQ ACK/NACK per cell according to the transmission mode of each cell and the "format 1b with channel selection" table having the HARQ ACK/NACK input information equal to or greater than 6.

The "format 1b with channel selection" table for M=3 is selected for the cells in the cases of M1=1-M2=5 and M1+M2=6, and the "format 1b with channel selection" table for M=4 is selected in the cases of M1+M2=7 and M1+M2=8.

Table 12 is the "format 1b with channel selection table" for M=3,

TABLE 12

| Primary Cell HARQ-ACK(0), HARQ-ACK(1), HARQ-ACK(2) | Secondary Cell HARQ-ACK(0), HARQ-ACK(1), HARQ-ACK(2) | Resource $n^{(1)}_{PUCCH}$ | Constellation b(0), b(1) | RM Code Input Bits o(0), o(1), o(2), o(3) |
|---|---|---|---|---|
| ACK, ACK, ACK | ACK, ACK, ACK | $n^{(1)}_{PUCCH,1}$ | 1, 1 | 1, 1, 1, 1 |
| ACK, ACK, NACK/DTX | ACK, ACK, ACK | $n^{(1)}_{PUCCH,1}$ | 0, 0 | 1, 0, 1, 1 |
| ACK, NACK/DTX, any | ACK, ACK, ACK | $n^{(1)}_{PUCCH,3}$ | 1, 1 | 0, 1, 1, 1 |
| NACK/DTX, any, any | ACK, ACK, ACK | $n^{(1)}_{PUCCH,3}$ | 0, 1 | 0, 0, 1, 1 |
| ACK, ACK, ACK | ACK, ACK, NACK/DTX | $n^{(1)}_{PUCCH,0}$ | 1, 0 | 1, 1, 1, 0 |
| ACK, ACK, NACK/DTX | ACK, ACK, NACK/DTX | $n^{(1)}_{PUCCH,3}$ | 1, 0 | 1, 0, 1, 0 |
| ACK, NACK/DTX, any | ACK, ACK, NACK/DTX | $n^{(1)}_{PUCCH,0}$ | 0, 1 | 0, 1, 1, 0 |
| NACK/DTX, any | ACK, ACK, NACK/DTX | $n^{(1)}_{PUCCH,3}$ | 0, 0 | 0, 0, 1, 0 |
| ACK, ACK, ACK | ACK, NACK/DTX, any | $n^{(1)}_{PUCCH,2}$ | 1, 1 | 1, 1, 0, 1 |
| ACK, ACK, NACK/DTX | ACK, NACK/DTX, any | $n^{(1)}_{PUCCH,2}$ | 0, 1 | 1, 0, 0, 1 |
| ACK, NACK/DTX, any | ACK, NACK/DTX, any | $n^{(1)}_{PUCCH,2}$ | 1, 0 | 0, 1, 0, 1 |
| NACK/DTX, any, any | ACK, NACK/DTX, any | $n^{(1)}_{PUCCH,2}$ | 0, 0 | 0, 0, 0, 1 |
| ACK, ACK, ACK | NACK/DTX, any, any | $n^{(1)}_{PUCCH,1}$ | 1, 0 | 1, 1, 0, 0 |
| ACK, ACK, NACK/DTX | NACK/DTX, any, any | $n^{(1)}_{PUCCH,1}$ | 0, 1 | 1, 0, 0, 0 |
| ACK, NACK/DTX, any | NACK/DTX, any, any | $n^{(1)}_{PUCCH,0}$ | 1, 1 | 0, 1, 0, 0 |
| NACK, any, any | NACK/DTX, any, any | $n^{(1)}_{PUCCH,0}$ | 0, 0 | 0, 0, 0, 0 |
| DTX, any, any | NACK/DTX, any, any | No Transmission | | 0, 0, 0, 0 |

Table 13 is the "format 1b with channel selection table" for M=4.

TABLE 13

| Primary Cell HARQ-ACK(0), HARQ-ACK(1), HARQ-ACK(2), HARQ-ACK(3) | Secondary Cell HARQ-ACK(0), HARQ-ACK(1), HARQ-ACK(2), HARQ-ACK(3) | Resource $n^{(1)}_{PUCCH}$ | Constellation b(0), b(1) | RM Code Input Bits o(0), o(1), o(2), o(3) |
|---|---|---|---|---|
| ACK, ACK, ACK, NACK/DTX | ACK, ACK, ACK, NACK/DTX | $n^{(1)}_{PUCCH,1}$ | 1, 1 | 1, 1, 1, 1 |
| ACK, ACK, NACK/DTX, any | ACK, ACK, ACK, NACK/DTX | $n^{(1)}_{PUCCH,1}$ | 0, 0 | 1, 0, 1, 1 |

TABLE 13-continued

| Primary Cell HARQ-ACK(0), HARQ-ACK(1), HARQ-ACK(2), HARQ-ACK(3) | Secondary Cell HARQ-ACK(0), HARQ-ACK(1), HARQ-ACK(2), HARQ-ACK(3) | Resource $n^{(1)}_{PUCCH}$ | Constellation b(0), b(1) | RM Code Input Bits o(0), o(1), o(2), o(3) |
|---|---|---|---|---|
| ACK, DTX, DTX, DTX | ACK, ACK, ACK, NACK/DTX | $n^{(1)}_{PUCCH,3}$ | 1, 1 | 0, 1, 1, 1 |
| ACK, ACK, ACK, ACK | ACK, ACK, ACK, NACK/DTX | $n^{(1)}_{PUCCH,3}$ | 1, 1 | 0, 1, 1, 1 |
| NACK/DTX, any, any, any | ACK, ACK, ACK, NACK/DTX | $n^{(1)}_{PUCCH,3}$ | 0, 1 | 0, 0, 1, 1 |
| (ACK, NACK/DTX, any, any), except for (ACK, DTX, DTX, DTX) | ACK, ACK, ACK, NACK/DTX | $n^{(1)}_{PUCCH,3}$ | 0, 1 | 0, 0, 1, 1 |
| ACK, ACK, ACK, NACK/DTX | ACK, ACK, NACK/DTX, any | $n^{(1)}_{PUCCH,0}$ | 1, 0 | 1, 1, 1, 0 |
| ACK, ACK, NACK/DTX, any | ACK, ACK, NACK/DTX, any | $n^{(1)}_{PUCCH,3}$ | 1, 0 | 1, 0, 1, 0 |
| ACK, DTX, DTX, DTX | ACK, ACK, NACK/DTX, any | $n^{(1)}_{PUCCH,0}$ | 0, 1 | 0, 1, 1, 0 |
| ACK, ACK, ACK, ACK | ACK, ACK, NACK/DTX, any | $n^{(1)}_{PUCCH,0}$ | 0, 1 | 0, 1, 1, 0 |
| NACK/DTX, any, any, any | ACK, ACK, NACK/DTX, any | $n^{(1)}_{PUCCH,3}$ | 0, 0 | 0, 0, 1, 0 |
| (ACK, NACK/DTX, any, any), except for (ACK, DTX, DTX, DTX) | ACK, ACK, NACK/DTX, any | $n^{(1)}_{PUCCH,3}$ | 0, 0 | 0, 0, 1, 0 |
| ACK, ACK, ACK, NACK/DTX | ACK, DTX, DTX, DTX | $n^{(1)}_{PUCCH,2}$ | 1, 1 | 1, 1, 0, 1 |
| ACK, ACK, ACK, NACK/DTX | ACK, ACK, ACK, ACK | $n^{(1)}_{PUCCH,2}$ | 1, 1 | 1, 1, 0, 1 |
| ACK, ACK, NACK/DTX, any | ACK, DTX, DTX, DTX | $n^{(1)}_{PUCCH,2}$ | 0, 1 | 1, 0, 0, 1 |
| ACK, ACK, NACK/DTX, any | ACK, ACK, ACK, ACK | $n^{(1)}_{PUCCH,2}$ | 0, 1 | 1, 0, 0, 1 |
| ACK, DTX, DTX, DTX | ACK, DTX, DTX, DTX | $n^{(1)}_{PUCCH,2}$ | 1, 0 | 0, 1, 0, 1 |
| ACK, DTX, DTX, DTX | ACK, ACK, ACK, ACK | $n^{(1)}_{PUCCH,2}$ | 1, 0 | 0, 1, 0, 1 |
| ACK, ACK, ACK, ACK | ACK, DTX, DTX, DTX | $n^{(1)}_{PUCCH,2}$ | 1, 0 | 0, 1, 0, 1 |
| ACK, ACK, ACK, ACK | ACK, ACK, ACK, ACK | $n^{(1)}_{PUCCH,2}$ | 1, 0 | 0, 1, 0, 1 |
| NACK/DTX, any, any, any | ACK, DTX, DTX, DTX | $n^{(1)}_{PUCCH,2}$ | 0, 0 | 0, 0, 0, 1 |
| NACK/DTX, any, any, any | ACK, ACK, ACK, ACK | $n^{(1)}_{PUCCH,2}$ | 0, 0 | 0, 0, 0, 1 |
| (ACK, NACK/DTX, any, any), except for (ACK, DTX, DTX, DTX) | ACK, DTX, DTX, DTX | $n^{(1)}_{PUCCH,2}$ | 0, 0 | 0, 0, 0, 1 |
| (ACK, NACK/DTX, any, any), except for (ACK, DTX, DTX, DTX) | ACK, ACK, ACK, ACK | $n^{(1)}_{PUCCH,2}$ | 0, 0 | 0, 0, 0, 1 |
| ACK, ACK, ACK, NACK/DTX | NACK/DTX, any, any, any | $n^{(1)}_{PUCCH,1}$ | 1, 0 | 1, 1, 0, 0 |
| ACK, ACK, ACK, NACK/DTX | (ACK, NACK/DTX, any, any), except for (ACK, DTX, DTX, DTX) | $n^{(1)}_{PUCCH,1}$ | 1, 0 | 1, 1, 0, 0 |
| ACK, ACK, NACK/DTX, any | NACK/DTX, any, any, any | $n^{(1)}_{PUCCH,1}$ | 0, 1 | 1, 0, 0, 0 |
| ACK, ACK, NACK/DTX, any | (ACK, NACK/DTX, any, any), except for (ACK, DTX, DTX, DTX) | $n^{(1)}_{PUCCH,1}$ | 0, 1 | 1, 0, 0, 0 |
| ACK, DTX, DTX, DTX | NACK/DTX, any, any, any | $n^{(1)}_{PUCCH,0}$ | 1, 1 | 0, 1, 0, 0 |
| ACK, DTX, DTX, DTX | (ACK, NACK/DTX, any, any), except for (ACK, DTX, DTX, DTX) | $n^{(1)}_{PUCCH,0}$ | 1, 1 | 0, 1, 0, 0 |
| ACK, ACK, ACK, ACK | NACK/DTX, any, any, any | $n^{(1)}_{PUCCH,0}$ | 1, 1 | 0, 1, 0, 0 |
| ACK, ACK, ACK, ACK | (ACK, NACK/DTX, any, any), except for (ACK, DTX, DTX, DTX) | $n^{(1)}_{PUCCH,0}$ | 1, 1 | 0, 1, 0, 0 |
| NACK, any, any, any | NACK/DTX, any, any, any | $n^{(1)}_{PUCCH,0}$ | 0, 0 | 0, 0, 0, 0 |
| NACK, any, any, any | (ACK, NACK/DTX, any, any), except for (ACK, DTX, DTX, DTX) | $n^{(1)}_{PUCCH,0}$ | 0, 0 | 0, 0, 0, 0 |

TABLE 13-continued

| Primary Cell<br>HARQ-ACK(0),<br>HARQ-ACK(1),<br>HARQ-ACK(2),<br>HARQ-ACK(3) | Secondary Cell<br>HARQ-ACK(0),<br>HARQ-ACK(1),<br>HARQ-ACK(2),<br>HARQ-ACK(3) | Resource $n^{(1)}_{PUCCH}$ | Constellation b(0), b(1) | RM Code Input Bits o(0), o(1), o(2), o(3) |
|---|---|---|---|---|
| (ACK, NACK/DTX, any, any), except for (ACK, DTX, DTX, DTX) | NACK/DTX, any, any, any | $n^{(1)}_{PUCCH,0}$ | 0, 0 | 0, 0, 0, 0 |
| (ACK, NACK/DTX, any, any), except for (ACK, DTX, DTX, DTX) | (ACK, NACK/DTX, any, any), except for (ACK, DTX, DTX, DTX) | $n^{(1)}_{PUCCH,0}$ | 0, 0 | 0, 0, 0, 0 |
| DTX, any, any, any | NACK/DTX, any, any, any | No Transmission | | 0, 0, 0, 0 |
| DTX, any, any, any | (ACK, NACK/DTX, any, any), except for (ACK, DTX, DTX, DTX) | No Transmission | | 0, 0, 0, 0 |

When applying the format 1b with channel selection, the mapping order of the HARQ ACK/NACK to the subframes of the cells has to be determined.

The mapping order according to the first exemplary embodiment is determined as follows. First, the PCell HARQ ACK/NACK is mapped to the HARQ-ACK(j) in sequence regardless of the cell. For example, the mapping is performed to the HARQ-ACK(j) in the ascending order of a Downlink Assignment Index (DAI) of PDCCH of the PCell. If there is no further PDCCH of the cell to be mapped, the mapping ends. If there is further PDCCH of the cell to be mapped, the mapping is performed to the HARQ-ACK(j) in the ascending order of DAI of PDCCH of the cell.

Accordingly, the HARQ ACK/NACK mapping order for M1+M2=5 and M1+M2=6 can be expressed as the following formula:

Formula 1

Set HARQ-ACK(0), HARQ-ACK(1), HARQ-ACK(2) for PCell and HARQ-ACK(0), HARQ-ACK(1), HARQ-ACK(2) for SCell to HARQ-ACK(0), HARQ-ACK(1), HARQ-ACK(2) HAW-ACK(3), HARQ-ACK(4), HARQ-ACK(5) regardless of cell.

If there is PDSCH without PDCCH on PCell
  For PCell, HARQ-ACK(0) in a case of PDSCH without PDCCH,
  For PCell, HARQ-ACK(j) in a case of PDSCH with PDCCH corresponding to DAI=j, $1 \leq j \leq M1=1$, and
  For SCell, HARQ-ACK(j+M1) in a case of PDSCH with PDCCH corresponding to DAI=j+1, $0 \leq j \leq M2-1$.
Otherwise,
  For PCell, HARQ-ACK(j) in a case of PDSCH with PDCCH corresponding to DAI=j+1, $0 \leq j \leq M1-1$, and
  For SCell, HARQ-ACK(j+M1) in a case of PDSCH with PDCCH corresponding to DAI=j+1, $0 \leq j \leq M2-1$.

In the case of M1+M2=5, if M1=1 and M2=4, M1=4 and M2=1, M1=2 and M2=3, or M1=3 and M2=2, the number of downlink subframes for which HARQ ACK/NACK has to be transmitted is less than that of the case of M1=3 and M2=3 by 1. Accordingly, when mapping the HARQ ACK/NACK to the HARQ-ACK(j) in the above manner, the last HARQ ACK/NACK in Table 12 can be used for DTX. At this time, the last HARQ-ACK(j) among those with the same type is used for DTX as shown in Table 14. The type is the value for discriminating among the transmission modes in the table but expressed explicitly in real transmission. In the case of M1=1 and M2=4, if the ACK corresponding to five subframes is transmitted, it can be transmitted on PUCCH only with [b(0), b(1)=1, 0] and [n(1 PUCCH n(1)PUCCH,0] rather than [b(0), b(1)=1,1] and [n(1)PUCCH=n(1)PUCCH,1]. Even when it is transmitted on PUSCH, the ACK is transmitted on the PUSCH only with [o(0),o(1),o(2),o(3)=1,1,1,0] rather than [o(0),o(1),o(2),o(3)),1,1,1].

TABLE 14

| Type | Primary Cell<br>HARQ-ACK(0),<br>HARQ-ACK(1),<br>HARQ-ACK(2) | Secondary Cell<br>HARQ-ACK(0),<br>HARQ-ACK(1),<br>HARQ-ACK(2) | Resource $n^{(1)}_{PUCCH}$ | Constellation b(0), b(1) | RM Code Input Bits o(0), o(1), o(2), o(3) |
|---|---|---|---|---|---|
| 1 | ACK, ACK, ACK | ACK, ACK, ACK | $n^{(1)}_{PUCCH,1}$ | 1, 1 | 1, 1, 1, 1 |
| 2 | ACK, ACK, NACK/DTX | ACK, ACK, ACK | $n^{(1)}_{PUCCH,1}$ | 0, 0 | 1, 0, 1, 1 |
| 3 | ACK, NACK/DTX, any | ACK, ACK, ACK | $n^{(1)}_{PUCCH,3}$ | 1, 1 | 0, 1, 1, 1 |
| 4 | NACK/DTX, any, any | ACK, ACK, ACK | $n^{(1)}_{PUCCH,3}$ | 0, 1 | 0, 0, 1, 1 |
| 1 | ACK, ACK, ACK | ACK, ACK, NACK/DTX | $n^{(1)}_{PUCCH,0}$ | 1, 0 | 1, 1, 1, 0 |
| 2 | ACK, ACK, NACK/DTX | ACK, ACK, NACK/DTX | $n^{(1)}_{PUCCH,3}$ | 1, 0 | 1, 0, 1, 0 |
| 3 | ACK, NACK/DTX, any | ACK, ACK, NACK/DTX | $n^{(1)}_{PUCCH,0}$ | 0, 1 | 0, 1, 1, 0 |
| 4 | NACK/DTX, any, any | ACK, ACK, NACK/DTX | $n^{(1)}_{PUCCH,3}$ | 0, 0 | 0, 0, 1, 0 |
| — | ACK, ACK, ACK | ACK, NACK/DTX, any | $n^{(1)}_{PUCCH,2}$ | 1, 1 | 1, 1, 0, 1 |

TABLE 14-continued

| Type | Primary Cell HARQ-ACK(0), HARQ-ACK(1), HARQ-ACK(2) | Secondary Cell HARQ-ACK(0), HARQ-ACK(1), HARQ-ACK(2) | Resource $n^{(1)}_{PUCCH}$ | Constellation b(0), b(1) | RM Code Input Bits o(0), o(1), o(2), o(3) |
|---|---|---|---|---|---|
| — | ACK, ACK, NACK/DTX | ACK, NACK/DTX, any | $n^{(1)}_{PUCCH,2}$ | 0, 1 | 1, 0, 0, 1 |
| — | ACK, NACK/DTX, any | ACK, NACK/DTX, any | $n^{(1)}_{PUCCH,2}$ | 1, 0 | 0, 1, 0, 1 |
| — | NACK/DTX, any, any | ACK, NACK/DTX, any | $n^{(1)}_{PUCCH,2}$ | 0, 0 | 0, 0, 0, 1 |
| — | ACK, ACK, ACK | NACK/DTX, any, any | $n^{(1)}_{PUCCH,1}$ | 1, 0 | 1, 1, 0, 0 |
| — | ACK, ACK, NACK/DTX | NACK/DTX, any, any | $n^{(1)}_{PUCCH,1}$ | 0, 1 | 1, 0, 0, 0 |
| — | ACK, NACK/DTX, any | NACK/DTX, any, any | $n^{(1)}_{PUCCH,0}$ | 1, 1 | 0, 1, 0, 0 |
| — | NACK, any, any | NACK/DTX, any, any | $n^{(1)}_{PUCCH,0}$ | 0, 0 | 0, 0, 0, 0 |
| — | DTX, any, any | NACK/DTX, any, any | No Transmission | | 0, 0, 0, 0 |

In addition, a new table can be configured as shown in Table 15 by setting the last HARQ ACK/NACK for use of DTX.

TABLE 15

| 2 cells | | | | |
|---|---|---|---|---|
| HARQ-ACK(0), HARQ-ACK(1), HARQ-ACK(2) | HARQ-ACK(3), HARQ-ACK(4) | Resource $n^{(1)}_{PUCCH}$ | Constellation b(0)b(1) | RM Code Input Bits o(0), o(1), o(2), o(3) |
| ACK, ACK, ACK | ACK, ACK | $n^{(1)}_{PUCCH,0}$ | 1, 0 | 1, 1, 1, 0 |
| ACK, ACK, NACK/DTX | ACK, ACK | $n^{(1)}_{PUCCH,3}$ | 1, 0 | 1, 0, 1, 0 |
| ACK, NACK/DTX, any | ACK, ACK | $n^{(1)}_{PUCCH,0}$ | 0, 1 | 0, 1, 1, 0 |
| NACK/DTX, any, any | ACK, ACK | $n^{(1)}_{PUCCH,3}$ | 0, 0 | 0, 0, 1, 0 |
| ACK, ACK, ACK | ACK, NACK/DTX | $n^{(1)}_{PUCCH,2}$ | 1, 1 | 1, 1, 0, 1 |
| ACK, ACK, NACK/DTX | ACK, NACK/DTX | $n^{(1)}_{PUCCH,2}$ | 0, 1 | 1, 0, 0, 1 |
| ACK, NACK/DTX, any | ACK, NACK/DTX | $n^{(1)}_{PUCCH,2}$ | 1, 0 | 0, 1, 0, 1 |
| NACK/DTX, any, any | ACK, NACK/DTX | $n^{(1)}_{PUCCH,2}$ | 0, 0 | 0, 0, 0, 1 |
| ACK, ACK, ACK | NACK/DTX, any | $n^{(1)}_{PUCCH,1}$ | 1, 0 | 1, 1, 0, 0 |
| ACK, ACK, NACK/DTX | NACK/DTX, any | $n^{(1)}_{PUCCH,1}$ | 0, 1 | 1, 0, 0, 0 |
| ACK, NACK/DTX, any | NACK/DTX, any | $n^{(1)}_{PUCCH,0}$ | 1, 1 | 0, 1, 0, 0 |
| NACK, any, any | NACK/DTX, any | $n^{(1)}_{PUCCH,0}$ | 0, 0 | 0, 0, 0, 0 |
| DTX, any, any | NACK/DTX, any | No Transmission | | 0, 0, 0, 0 |

In addition, the DTX bit can be arranged at a position other than the last HARQ ACK/NACK position.

Although the description has been directed to the case of processing HARQ ACK/NACK as DTX when there is no need of HARQ ACK/NACK transmission at downlink subframe, it is also possible to replace DTX with ACK. Thereafter, the HARQ ACK/NACK mapping order for M1+M2=7 and M1+M2=8 can be expressed as the following formula:

Formula 2

Set HARQ-ACK(0), HARQ-ACK(1), HARQ-ACK(2), HARQ-ACK(3) for PCell and HARQ-ACK(0), HARQ-ACK(1), HARQ-ACK(2), HARQ-ACK(3) for SCell to HARQ-ACK(0), HARQ-ACK(1), HARQ-ACK(2) HARQ-ACK(3), HARQ-ACK(4), HARQ-ACK(5), HARQ-ACK(6), HARQ-ACK(7) regardless of cell.

If there is PDSCH i without PDCCH on PCell

For PCell, HARQ-ACK(0) in a case of PDSCH without PDCCH,

For PCell, HARQ-ACK(j) in a case of PDSCH with PDCCH corresponding to DAI=j, 1≤j≤M1-1, and For SCell, HARQ-ACK(j+M1) in a case of PDSCH with PDCCH corresponding to DAI=j+1, 0≤j≤M2-1.

Otherwise,

For PCell, HARQ-ACK(j) in a case of PDSCH with PDCCH corresponding to DAI=j+1, 0≤j≤M1-1, and For SCell, HARQ-ACK(j+M1) in a case of PDSCH with PDCCH corresponding to DAI=j+1, 0≤j≤M2=1.

In the case of M1+M2=7, if M1=3 and M2=4 or M1=4 and M2=3, the number of downlink subframes for which HARQ ACK/NACK has to be transmitted is less than that of the case of M1=4 and M2=4 by 1. Accordingly, when mapping the HARQ ACK/NACK to HARQ-ACK(j) in the above manner, the last HARQ ACK/NACK in Table 13 can be used for DTX.

At this time, the row of which the last HARQ-ACK(j) has DTX among the rows of the same type is used as shown in Table 16. The type is the value for discriminating among the transmission modes in the table but expressed explicitly in real transmission. In the case of M1=3 and M2=4, if the ACK corresponding to seven subframes is transmitted, it can be transmitted only with [b(0),b(1)=1, 1] and [n(1)PUCCH=n(1)PUCCH,3] rather than [b(0),b(1)=1,0] and [n(1)PUCCH=n(11)PUCCH,2]. Even when it is transmitted on PUSCH, the ACK is transmitted on the PUSCH only with [o(0),o(1),o(2),o(3)=0,1,1,1] rather than [o(0),o(1),o(2),o(3)=0,1,0,1].

TABLE 16

| Type | Primary Cell HARQ-ACK(0), HARQ-ACK(1), HARQ-ACK(2), HARQ-ACK(3) | Secondary Cell HARQ-ACK(0), HARQ-ACK(1), HARQ-ACK(2), HARQ-ACK(3) | Resource $n_{PUCCH}^{(1)}$ | Constellation b(0), b(1) | RM Code Input Bits o(0), o(1), o(2) |
|---|---|---|---|---|---|
| 1 | ACK, ACK, ACK, NACK/DTX | ACK, ACK, ACK, NACK/DTX | $n_{PUCCH,1}^{(1)}$ | 1, 1 | 1, 1, 1, 1 |
| 2 | ACK, ACK, NACK/DTX, any | ACK, ACK, ACK, NACK/DTX | $n_{PUCCH,1}^{(1)}$ | 0, 0 | 1, 0, 1, 1 |
| 3 | ACK, DTX, DTX, DTX | ACK, ACK, ACK, NACK/DTX | $n_{PUCCH,3}^{(1)}$ | 1, 1 | 0, 1, 1, 1 |
| 4 | ACK, ACK, ACK, ACK | ACK, ACK, ACK, NACK/DTX | $n_{PUCCH,3}^{(1)}$ | 1, 1 | 0, 1, 1, 1 |
| 5 | NACK/DTX, any, any, any | ACK, ACK, ACK, NACK/DTX | $n_{PUCCH,3}^{(1)}$ | 0, 1 | 0, 0, 1, 1 |
| 6 | (ACK, NACK/DTX, any, any), except for (ACK, DTX, DTX, DTX) | ACK, ACK, ACK, NACK/DTX | $n_{PUCCH,3}^{(1)}$ | 0, 1 | 0, 0, 1, 1 |
| — | ACK, ACK, ACK, NACK/DTX | ACK, ACK, NACK/DTX, any | $n_{PUCCH,0}^{(1)}$ | 1, 0 | 1, 1, 1, 0 |
| — | ACK, ACK, NACK/DTX, any | ACK, ACK, NACK/DTX, any | $n_{PUCCH,3}^{(1)}$ | 1, 0 | 1, 0, 1, 0 |
| — | ACK, DTX, DTX, DTX | ACK, ACK, NACK/DTX, any | $n_{PUCCH,0}^{(1)}$ | 0, 1 | 0, 1, 1, 0 |
| — | ACK, ACK, ACK, ACK | ACK, ACK, NACK/DTX, any | $n_{PUCCH,0}^{(1)}$ | 0, 1 | 0, 1, 1, 0 |
| — | NACK/DTX, any, any, any | ACK, ACK, NACK/DTX, any | $n_{PUCCH,3}^{(1)}$ | 0, 0 | 0, 0, 1, 0 |
| — | (ACK, NACK/DTX, any, any), except for (ACK, DTX, DTX, DTX) | ACK, ACK, NACK/DTX, any | $n_{PUCCH,3}^{(1)}$ | 0, 0 | 0, 0, 1, 0 |
| — | ACK, ACK, ACK, NACK/DTX | ACK, DTX, DTX, DTX | $n_{PUCCH,2}^{(1)}$ | 1, 1 | 1, 1, 0, 1 |
| 1 | ACK, ACK, ACK, NACK/DTX | ACK, ACK, ACK, ACK | $n_{PUCCH,2}^{(1)}$ | 1, 1 | 1, 1, 0, 1 |
| — | ACK, ACK, NACK/DTX, any | ACK, DTX, DTX, DTX | $n_{PUCCH,2}^{(1)}$ | 0, 1 | 1, 0, 0, 1 |
| 2 | ACK, ACK, NACK/DTX, any | ACK, ACK, ACK, ACK | $n_{PUCCH,2}^{(1)}$ | 0, 1 | 1, 0, 0, 1 |
| — | ACK, DTX, DTX, DTX | ACK, DTX, DTX, DTX | $n_{PUCCH,2}^{(1)}$ | 1, 0 | 0, 1, 0, 1 |
| 3 | ACK, DTX, DTX, DTX | ACK, ACK, ACK, ACK | $n_{PUCCH,2}^{(1)}$ | 1, 0 | 0, 1, 0, 1 |
| — | ACK, ACK, ACK, ACK | ACK, DTX, DTX, DTX | $n_{PUCCH,2}^{(1)}$ | 1, 0 | 0, 1, 0, 1 |
| 4 | ACK, ACK, ACK, ACK | ACK, ACK, ACK, ACK | $n_{PUCCH,2}^{(1)}$ | 1, 0 | 0, 1, 0, 1 |
| — | NACK/DTX, any, any, any | ACK, DTX, DTX, DTX | $n_{PUCCH,2}^{(1)}$ | 0, 0 | 0, 0, 0, 1 |
| 5 | NACK/DTX, any, any, any | ACK, ACK, ACK, ACK | $n_{PUCCH,2}^{(1)}$ | 0, 0 | 0, 0, 0, 1 |
| — | (ACK, NACK/DTX, any, any), except for (ACK, DTX, DTX, DTX) | ACK, DTX, DTX, DTX | $n_{PUCCH,2}^{(1)}$ | 0, 0 | 0, 0, 0, 1 |
| 6 | (ACK, NACK/DTX, any, any), except for (ACK, DTX, DTX, DTX) | ACK, ACK, ACK, ACK | $n_{PUCCH,2}^{(1)}$ | 0, 0 | 0, 0, 0, 1 |
| — | ACK, ACK, ACK, NACK/DTX | NACK/DTX, any, any, any | $n_{PUCCH,1}^{(1)}$ | 1, 0 | 1, 1, 0, 0 |
| — | ACK, ACK, ACK, NACK/DTX | (ACK, NACK/DTX, any, any), except for (ACK, DTX, DTX, DTX) | $n_{PUCCH,1}^{(1)}$ | 1, 0 | 1, 1, 0, 0 |
| — | ACK, ACK, NACK/DTX, any | NACK/DTX, any, any, any | $n_{PUCCH,1}^{(1)}$ | 0, 1 | 1, 0, 0, 0 |
| — | ACK, ACK, NACK/DTX, any | (ACK, NACK/DTX, any, any), except for (ACK, DTX, DTX, DTX) | $n_{PUCCH,1}^{(1)}$ | 0, 1 | 1, 0, 0, 0 |
| — | ACK, DTX, DTX, DTX | NACK/DTX, any, any, any | $n_{PUCCH,0}^{(1)}$ | 1, 1 | 0, 1, 0, 0 |

TABLE 16-continued

| Type | Primary Cell HARQ-ACK(0), HARQ-ACK(1), HARQ-ACK(2), HARQ-ACK(3) | Secondary Cell HARQ-ACK(0), HARQ-ACK(1), HARQ-ACK(2), HARQ-ACK(3) | Resource $n_{PUCCH}^{(1)}$ | Constellation b(0), b(1) | RM Code Input Bits o(0), o(1), o(2) |
|---|---|---|---|---|---|
| — | ACK, DTX, DTX, DTX | (ACK, NACK/DTX, any, any), except for (ACK, DTX, DTX, DTX) | $n_{PUCCH,0}^{(1)}$ | 1, 1 | 0, 1, 0, 0 |
| — | ACK, ACK, ACK, ACK | NACK/DTX, any, any, any | $n_{PUCCH,0}^{(1)}$ | 1, 1 | 0, 1, 0, 0 |
| — | ACK, ACK, ACK, ACK | (ACK, NACK/DTX, any, any), except for (ACK, DTX, DTX, DTX) | $n_{PUCCH,0}^{(1)}$ | 1, 1 | 0, 1, 0, 0 |
| — | NACK, any, any, any | NACK/DTX, any, any, any | $n_{PUCCH,0}^{(1)}$ | 0, 0 | 0, 0, 0, 0 |
| — | NACK, any, any, any | (ACK, NACK/DTX, any, any), except for (ACK, DTX, DTX, DTX) | $n_{PUCCH,0}^{(1)}$ | 0, 0 | 0, 0, 0, 0 |
| — | (ACK, NACK/DTX, any, any), except for ACK, DTX, DTX, DTX) | NACK/DTX, any, any, any | $n_{PUCCH,0}^{(1)}$ | 0, 0 | 0, 0, 0, 0 |
| — | (ACK, NACK/DTX, any, any), except for (ACK, DTX, DTX, DTX) | (ACK, NACK/DTX, any, any), except for (ACK, DTX, DTX, DTX) | $n_{PUCCH,0}^{(1)}$ | 0, 0 | 0, 0, 0, 0 |
| — | DTX, any, any, any | NACK/DTX, any, any, any | No Transmission | | 0, 0, 0, 0 |
| — | DTX, any, any, any | (ACK, NACK/DTX, any, any), except for (ACK, DTX, DTX, DTX) | No Transmission | | 0, 0, 0, 0 |

TABLE 17

| 2 cells | | | | |
|---|---|---|---|---|
| HARQ-ACK(0), HARQ-ACK(1), HARQ-ACK(2), HARQ-ACK(3) | HARQ-ACK(4), HARQ-ACK(5), HARQ-ACK(6) | Resource $n_{PUCCH}^{(1)}$ | Constellation b(0), b(1) | RM Code Input Bits o(0), o(1), o(2), o(3) |
| ACK, ACK, ACK, NACK/DTX | ACK, ACK, ACK | $n_{PUCCH,1}^{(1)}$ | 1, 1, | 1, 1, 1, 1 |
| ACK, ACK, NACK/DTX, any | ACK, ACK, ACK | $n_{PUCCH,1}^{(1)}$ | 0, 0 | 1, 0, 1, 1 |
| ACK, DTX, DTX, DTX | ACK, ACK, ACK | $n_{PUCCH,3}^{(1)}$ | 1, 1 | 0, 1, 1, 1 |
| ACK, ACK, ACK, ACK | ACK, ACK, ACK | $n_{PUCCH,3}^{(1)}$ | 1, 1 | 0, 1, 1, 1 |
| NACK/DTX, any, any, any | ACK, ACK, ACK | $n_{PUCCH,3}^{(1)}$ | 0, 1 | 0, 0, 1, 1 |
| (ACK, NACK/DTX, any, any), except for (ACK, DTX, DTX, DTX) | ACK, ACK, ACK | $n_{PUCCH,3}^{(1)}$ | 0, 1 | 0, 0, 1, 1 |
| ACK, ACK, ACK, NACK/DTX | ACK, ACK, NACK/DTX | $n_{PUCCH,0}^{(1)}$ | 1, 0 | 1, 1, 1, 0 |
| ACK, ACK, NACK/DTX, any | ACK, ACK, NACK/DTX | $n_{PUCCH,3}^{(1)}$ | 1, 0 | 1, 0, 1, 0 |
| ACK, DTX, DTX, DTX | ACK, ACK, NACK/DTX | $n_{PUCCH,0}^{(1)}$ | 0, 1 | 0, 1, 1, 0 |
| ACK, ACK, ACK, ACK | ACK, ACK, NACK/DTX | $n_{PUCCH,0}^{(1)}$ | 0, 1 | 0, 1, 1, 0 |
| NACK/DTX, any, any, any | ACK, ACK, NACK/DTX | $n_{PUCCH,3}^{(1)}$ | 0, 0 | 0, 0, 1, 0 |
| (ACK, NACK/DTX, any, any), except for (ACK, DTX, DTX, DTX) | ACK, ACK, NACK/DTX | $n_{PUCCH,3}^{(1)}$ | 0, 0 | 0, 0, 1, 0 |
| ACK, ACK, ACK, NACK/DTX | ACK, DTX, DTX | $n_{PUCCH,2}^{(1)}$ | 1, 1 | 1, 1, 0, 1 |

TABLE 17-continued

| | 2 cells | | | |
|---|---|---|---|---|
| HARQ-ACK(0), HARQ-ACK(1), HARQ-ACK(2), HARQ-ACK(3) | HARQ-ACK(4), HARQ-ACK(5), HARQ-ACK(6) | Resource $n_{PUCCH}^{(1)}$ | Constellation Bits b(0), b(1) | RM Code Input Bits o(0), o(1), o(2), o(3) |
| ACK, ACK, NACK/DTX, any | ACK, DTX, DTX | $n_{PUCCH,2}^{(1)}$ | 0, 1 | 1, 0, 0, 1 |
| ACK, DTX, DTX, DTX | ACK, DTX, DTX | $n_{PUCCH,2}^{(1)}$ | 1, 0 | 0, 1, 0, 1 |
| ACK, ACK, ACK, ACK | ACK, DTX, DTX | $n_{PUCCH,2}^{(1)}$ | 1, 0 | 0, 1, 0, 1 |
| NACK/DTX, any, any, any | ACK, DTX, DTX | $n_{PUCCH,2}^{(1)}$ | 0, 0 | 0, 0, 0, 1 |
| (ACK, NACK/DTX, any, any), except for (ACK, DTX, DTX, DTX) | ACK, DTX, DTX | $n_{PUCCH,2}^{(1)}$ | 0, 0 | 0, 0, 0, 1 |
| ACK, ACK, ACK, NACK/DTX | NACK/DTX, any, any | $n_{PUCCH,1}^{(1)}$ | 1, 0 | 1, 1, 0, 0 |
| ACK, ACK, ACK, NACK/DTX | (ACK, NACK/DTX, any), except for (ACK, DTX, DTX) | $n_{PUCCH,1}^{(1)}$ | 1, 0 | 1, 1, 0, 0 |
| ACK, ACK, NACK/DTX, any | NACK/DTX, any, any | $n_{PUCCH,1}^{(1)}$ | 0, 1 | 1, 0, 0, 0 |
| ACK, ACK, NACK/DTX, any | (ACK, NACK/DTX, any, any), except for (ACK, DTX, DTX, DTX) | $n_{PUCCH,1}^{(1)}$ | 0, 1 | 1, 0, 0, 0 |
| ACK, DTX, DTX, DTX | NACK/DTX, any, any, any | $n_{PUCCH,0}^{(1)}$ | 1, 1 | 0, 1, 0, 0 |
| ACK, DTX, DTX, DTX | (ACK, NACK/DTX, any), except for (ACK, DTX, DTX) | $n_{PUCCH,0}^{(1)}$ | 1, 1 | 0, 1, 0, 0 |
| ACK, ACK, ACK, ACK | NACK/DTX, any, any | $n_{PUCCH,0}^{(1)}$ | 1, 1 | 0, 1, 0, 0 |
| ACK, ACK, ACK, ACK | (ACK, NACK/DTX, any), except for (ACK, DTX, DTX) | $n_{PUCCH,0}^{(1)}$ | 1, 1 | 0, 1, 0, 0 |
| NACK, any, any, any | NACK/DTX, any, any | $n_{PUCCH,0}^{(1)}$ | 0, 0 | 0, 0, 0, 0 |
| NACK, any, any, any | (ACK, NACK/DTX, any), except for (ACK, DTX, DTX) | $n_{PUCCH,0}^{(1)}$ | 0, 0 | 0, 0, 0, 0 |
| (ACK, NACK/DTX, any, any), except for (ACK, DTX, DTX, DTX) | NACK/DTX, any, any | $n_{PUCCH,0}^{(1)}$ | 0, 0 | 0, 0, 0, 0 |
| (ACK, NACK/DTX, any, any), except for (ACK, DTX, DTX, DTX) | (ACK, NACK/DTX, any), except for (ACK, DTX, DTX) | $n_{PUCCH,0}^{(1)}$ | 0, 0 | 0, 0, 0, 0 |
| DTX, any, any, any | NACK/DTX, any, any | No Transmission | | 0, 0, 0, 0 |
| DTX, any, any, any | (ACK, NACK/DTX, any), except for (ACK, DTX, DTX) | No Transmission | | 0, 0, 0, 0 |

In addition, the DTX bit can be arranged at a position other than the last HARQ ACK/NACK position.

Although the description has been directed to the case of processing HARQ ACK/NACK as DTX when there is no need of HARQ ACK/NACK transmission at downlink subframe, it is also possible to replace DTX with ACK.

In the case of M1+M2=5 or M1+M2=6, when ready to take a risk of information loss, the HARQ ACK/NACK can be transmitted using the "format 1b with channel selection" table defined for the case of M1=4 and M2=4 instead of M1=3 and M2=3 for M1=1 and M2=4, M1=4 and M2=1, M1=2 and M2=4, or M1=4 and M2=2. In the case of M1=1 and M2=4 of M1=4 and M2=1, the number of downlink subframes for which HARQ ACK/NACK has to be transmitted is less than that of the case of M1=4 and M2=4 by 3. Accordingly, the last three HARQ ACK/NACK can be set for DTX to use the table for the case of 1\41=4 and M2=4 or a newly configured table. The DTX bits can be arranged at other positions than the last three HARQ ACK/NACK positions. In the case of M1=2 and M2=1 or M1=4 and M2=2, the number of downlink subframes for which HARQ ACK/NACK has to be transmitted is less than that of the case of M1=4 and M2=4 by 2. Accordingly, the last two HARQ ACK/NACK can be set to DTX for use of the table defined for the case of M1=4 and M2=4 or a newly configured table. The DTX bits can be arranged at other positions than the last two HARQ ACK/NACK positions. Although the description has been directed to the case of processing HARQ ACK/NACK as DTX when there is no need of HARQ ACK/NACK transmission at downlink subframe, it is also possible to replace DTX with ACK.

The PUCCH transmission resource can be determined if there is PDCCH received at a PCell subframe, based on the CCE value of PDCCH, or if there is no PDCCH received at a PCell subframe, through higher layer signal. The transmission resource is determined, if there is PDCCH received at a SCell downlink subframe, based on the TPC field of the PDCCH, and the PUCCH resource corresponding to the TPC value is informed through higher layer signaling.

In the case of M1+M2=5 or M1+M2=6, in order to compensate for the performance degradation predicted in using the "format 1b with channel selection" table defined for M1=4 and M2=4 instead of M1=3 and M2=3 for the cases of M1=1 and M2=4, M1=4 and M2=1, M1=2 and M2=4, or M1=4 and M2=2, the spatial bundling is applied to only the cell with M of large value but may not be applied to the cell with M of small value. In the first example, if M1=1 and M2=4, this means that the PCell's M is less than the SCell's M and thus, if the PCell is the cell configured with the transmission mode for transmitting HARQ ACK/NACK corresponding to the two TBs, the spatial bundling may not be applied, in the case of using the "format 1b with channel selection" table defined for M1=4 and M2=4, instead of transmitting meaningless information by processing the HARQ ACK/NACK corresponding to three downlink subframes having no transmission in the PCell as DTX or ACK, the UE maps the HARQ ACK/NACK corresponding to the respective TBs and maps the DTX or ACK to the remained two inputs without application of the spatial bundling when transmitting the HARQ ACK/NACK corresponding to one downlink subframe having scheduled transmission. In addition, instead of mapping meaningless DTX or ACK to two remained inputs, it is possible to map the HARQ ACK/NACK corresponding to the predefined TBs additionally. In the second example, if M1=4, M2=1, this means that the SCells M is less than the PCell's M and thus, if the SCell is the cell configured with the transmission mode for transmitting HARQ ACK/NACK corresponding to two TBs, the spatial bundling may not be applied. In the case of using the "format 1b with channel selection" table defined for M1=4 and M2=4, instead of transmitting meaningless information by processing the HARQ ACK/NACK corresponding to three downlink subframes having no scheduled transmission in the PCell as DTX or ACK, the HARQ ACK/NACK corresponding to the respective TBs is transmitted when the HARQ ACK/NACK corresponding to one downlink subframe having scheduled transmission is transmitted, by mapping the HARQ ACK/NACK corresponding to the respective TBs and mapping DTC or ACK to the two remained inputs without application of the spatial bundling. In addition, instead of mapping the DTX or ACK to the two remained inputs, the HARQ ACK/NACK corresponding to predefined TBs are mapped additionally.

In the third example, if M1=2 and M2=4, this means that the PCell's M is less than the SCell's M and thus, if the PCell is the cell configured with the transmission mode for transmitting HARQ ACK/NACK corresponding to the two TBs, the spatial bundling may not be applied. In the case of using the "format 1b with channel selection" table defined for M1=4 and M2=4, instead of transmitting meaningless information by processing the HARQ ACK/NACK corresponding to two downlink subframes having no transmission in the PCell as DTX or ACK, the UE, when transmitting the scheduled HARQ ACK/NACK corresponding to two downlink subframes, maps the HARQ ACK/NACK corresponding to the respective TBs, without application of the spatial bundling. In the fourth example, if M1=4 and M2=2, this means that the SCell's M is less than the PCell's M and thus, if the SCell is the cell configured with the transmission mode for transmitting HARQ ACK/NACK corresponding to two TBs, the spatial bundling may not be applied.

In the case of using the "format 1b with channel selection" table defined for M1=4 and M2=4, instead of transmitting meaningless information by processing the HARQ ACK/NACK corresponding to two downlink subframes having no scheduled transmission in the SCell as DTX or ACK, the HARQ ACK/NACK corresponding to the respective TBs is transmitted when the HARQ ACK/NACK corresponding to two downlink subframes having scheduled transmission is transmitted, by mapping the HARQ ACK/NACK corresponding to the respective TBs, without application of the spatial bundling.

In order to use the "format 1b with channel selection" table defined for M1=4 and M2=4 in the second example, four PUCCH transmission resources have to be determined and thus, if there is PDCCH received at PCell downlink subframe, the resource for the cell to which spatial bundling is not applied can be determined by the first CCE value nCCE and nCCE+1 of the PDCCH for the cell to which spatial bundling is not applied. In a case where there is PDCCH received at PCell downlink subframe, the resource for the cell to which spatial bundling is not applied is determined through the TPC field of PDCCH for the cell to which the spatial bundling is not applied, and the PUCCH resource corresponding to the TPC value is transmitted through higher layer signaling.

Figure 4:
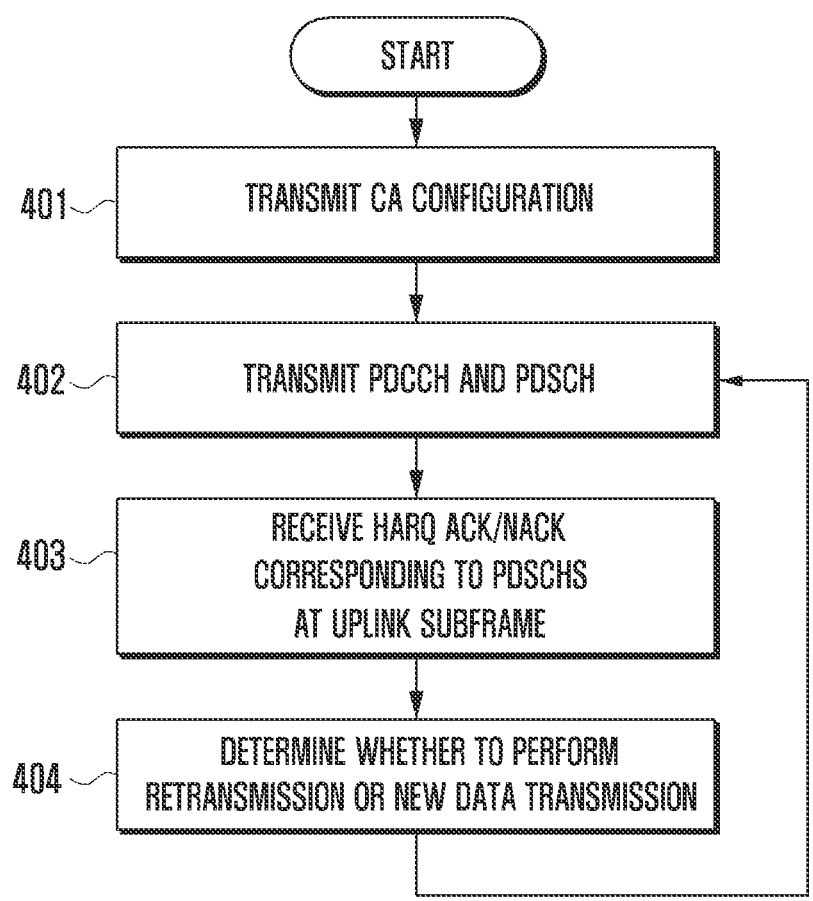
FIG. 4 is a flowchart illustrating an operation of an evolved Node B (eNB) according to an exemplary embodiment of the present invention.

FIG. 4 is a flowchart illustrating an operation of an eNB according to an exemplary embodiment of the present invention.

Referring to FIG. 4, the eNB sends a UE a Carrier Aggregation (CA) configuration to configure the UE to receive PDSCH through multiple cells at step 401. The eNB sends the UE PDCCH and PDSCH through the configured multiple cells at step 402. The eNB receives HARQ ACK/NACK corresponding to the PDSCH per cell at a specific uplink subframe according to K and M at step 403. When receiving the HARQ ACK/NACK, the eNB acquires the HARQ ACK/NACK transmitted by the UE using the "format 1b with channel selection" table determined based on M. The eNB determines whether to perform retransmission of the PDSCH or initiation transmission of new PDSCH based on the acquired HARQ ACK/NACK at step 404.

Figure 5:
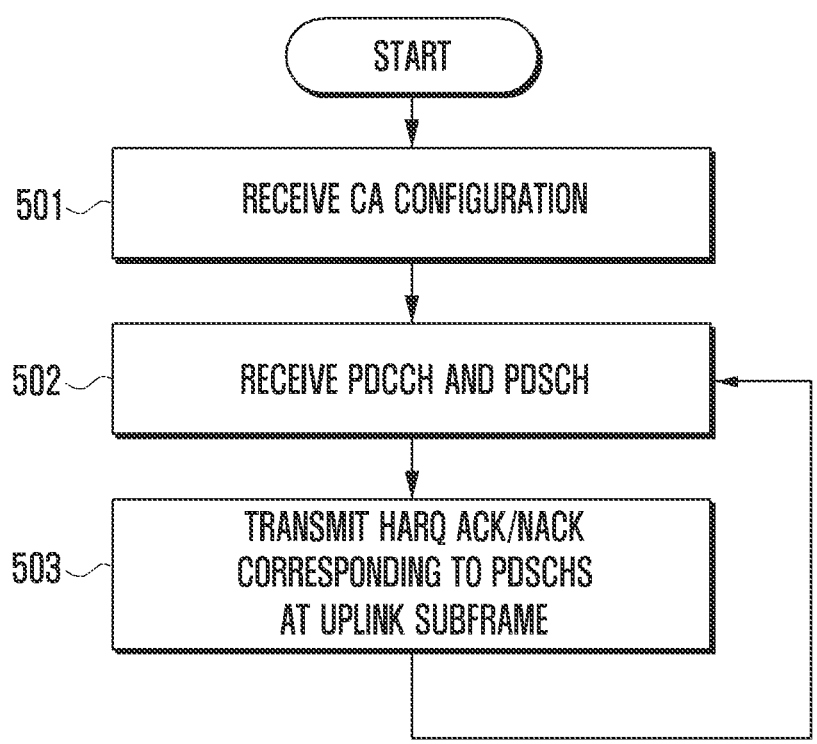
FIG. 5 is a flowchart illustrating an operation of a User Equipment (LYE) according to an exemplary embodiment of the present invention.

FIG. 5 is a flowchart illustrating an operation of a UE according to an exemplary embodiment of the present invention.

Referring to FIG. 5, the UE receives PDCCH and PDSCH in the cells configured at step 501 according to the scheduling of an eNB at step 502. The UE transmits HARQ ACK/NACK corresponding to the PDSCH at a specific uplink subframe according to K and M at step 503. The HARQ ACK'NACK information is transmitted to the eNB using the "format 1b with channel selection" table determined based on M. Thereafter, the UE returns the operation to step 502.

Figure 6:
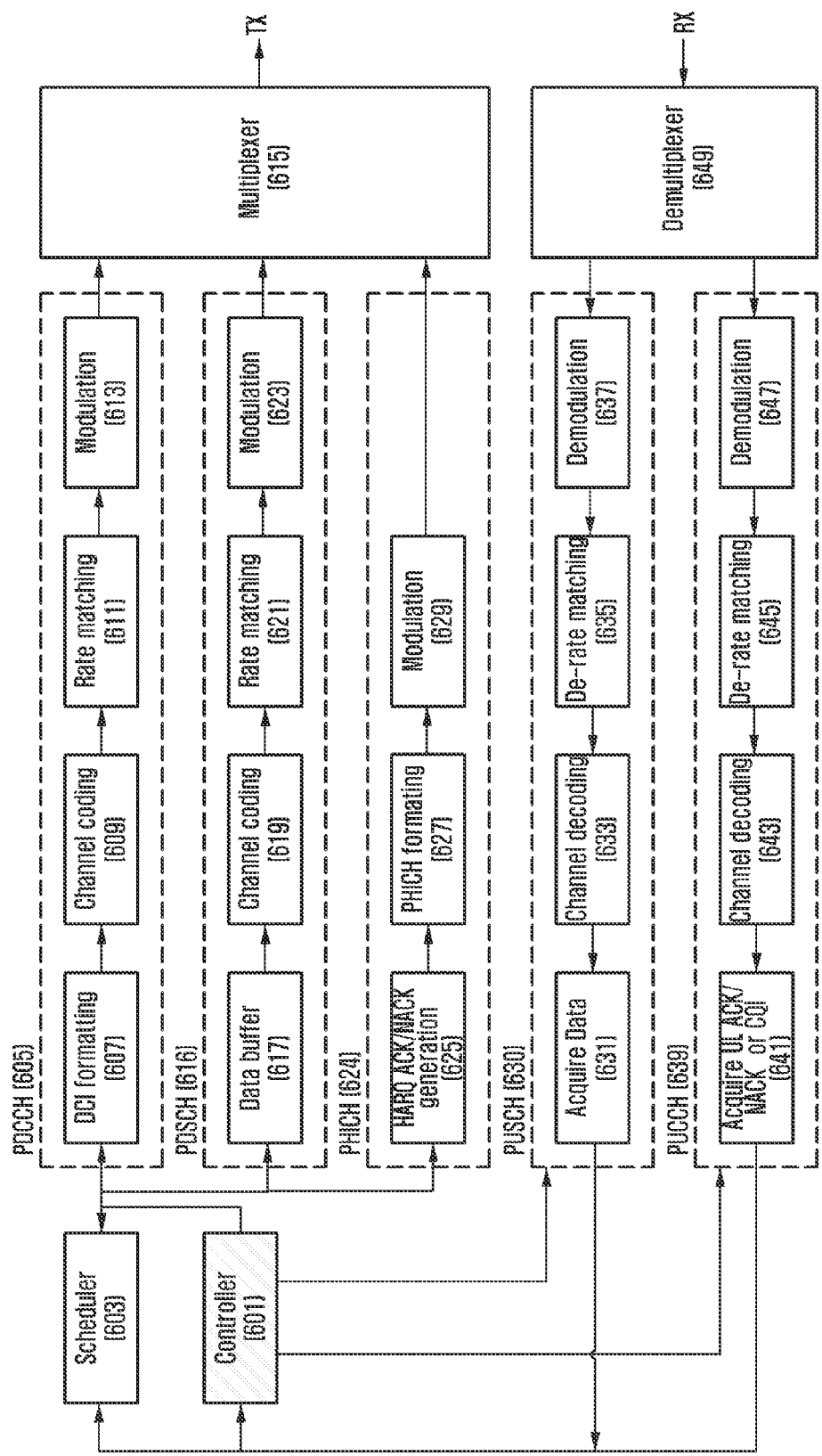
FIG. 6 is a block diagram illustrating an eNB apparatus according to an exemplary embodiment of the present invention.

FIG. 6 is a block diagram illustrating an eNB apparatus according to an exemplary embodiment of the present invention.

Referring to FIG. 6, the eNB apparatus includes a transmitter having a PDCCH block 605, and PDSCH block 616, a Physical Hybrid ARQ Indicator CHannel (PHICH) block 624, a multiplexer 615, a receiver having a PUSCH block 630, a PUCCH block 639, and a demultiplexer 649, a controller 601, and a scheduler 603. Although the numbers of the transmitters and receivers (except for PUCCH block) vary depending on the number of aggregated carriers, the description is made under the assumption of one transmitter and one receiver for simplicity. In the transmitter, the PDCCH block 605 includes a DCI formatter 607, a channel coder 609, a rate matching unit 611, and a modulator 613. The PDSCH block 616 includes a data buffer 617, a channel coder 619, a rate matching unit 621, and a modulator 623. The PHICH block 624 includes a HARQ ACK/NACK generator 625, a PHICH formatter 627, and a modulator 629. In the receiver, the PUSCH block 630 includes a demodulator 637, a de-rate matching unit 635, a channel decoder 633, and a data acquisition unit 631. The PUCCH block 639 includes a demodulator 647, a de-rate matching unit 645, a channel decoder 643, and an ACK/NACK or Channel Quality Indicator (CQI) acquisition unit 641.

The controller 601 notifies the scheduler 603, the PUSCH block 630, and the PUCCH block 639 of the information for receiving HARQ ACK/NACK corresponding to PDSCH in a specific uplink subframes for the UE to be scheduled in consideration of the data amount to be transmitted to the LIE and the available system resource amount. The information for receiving the HARQ ACK/NACK corresponding to PDSCH in a specific uplink transmission is of the above-described exemplary embodiment of the present invention. The PDCCH block 605 formats a DCI by means of the DCI formatter 607 under the control of the scheduler 603, adds error correction capability to the DCI by means of the channel coder 609, performs rate matching on the DCI to be fit for the resource amount by means of the rate matching unit 611, modulates the rate matching result, and multiplexes the modulated signal with other signals by means of the multiplexer 615.

The PDSCH block 616 extracts and reads out data from the data buffer 617 under the control of the scheduler 603, adds error correction capability to the read data by means of the channel coder 619, matches the rate of the data to be fit for the allocated resource amount by means of the rate matching unit 621, modulates the rate-matched data by means of the modulator 623, and multiplexes the modulated data with other signals by means of the multiplexer 615. The CA configuration information can be transmitted to the UE through the PDSCH block.

The PHICH block 624 generates HARQ ACK/NACK corresponding to the PUSCH received from the UE by means of the HARQ ACK/NACK generator 625 under the control of the scheduler 603. The HARQ ACK/NACK is configured to be fit for the PHICH channel structure by means of the PHICH formatter 627, modulated by means of the modulator 619, and multiplexed with other signals by means of the multiplexer 615.

The multiplexed signals are generated into an Orthogonal Frequency Division Multiplexing (OFDM) signal to be transmitted to the UE.

In the receiver, the PUSCH block 630 extracts PUSCH form the signal transmitted by the UE by means of the demultiplexer 649, demodulates the extracted signal by means of the demodulator 637, de-rate matches to generate the symbols before rate matching by means of the de-rate matching unit 635, decodes the de-rate matched signal by means of the channel decoder 633, and acquires PUSCH data by means of the data acquisition unit 631.

The PUCCH block 639 separates a PUCCH signal from the signal transmitted by the UE by means of the demultiplexer 649, demodulates the PUCCH by means of the demodulator 647, and decodes the demodulated signal by means of the channel decoder 633. The controller 601 acquires uplink ACK/NACK or CQI from the information carrier in a specific uplink subframe corresponding to PDSCH by means of the UL ACK/NACK or CQI acquisition unit 641. The acquired UL ACK/NACK or CQI is supplied to the scheduler 630 for use in determination of PUSCH retransmission and Modulation and Coding Scheme (MCS).

Figure 7:
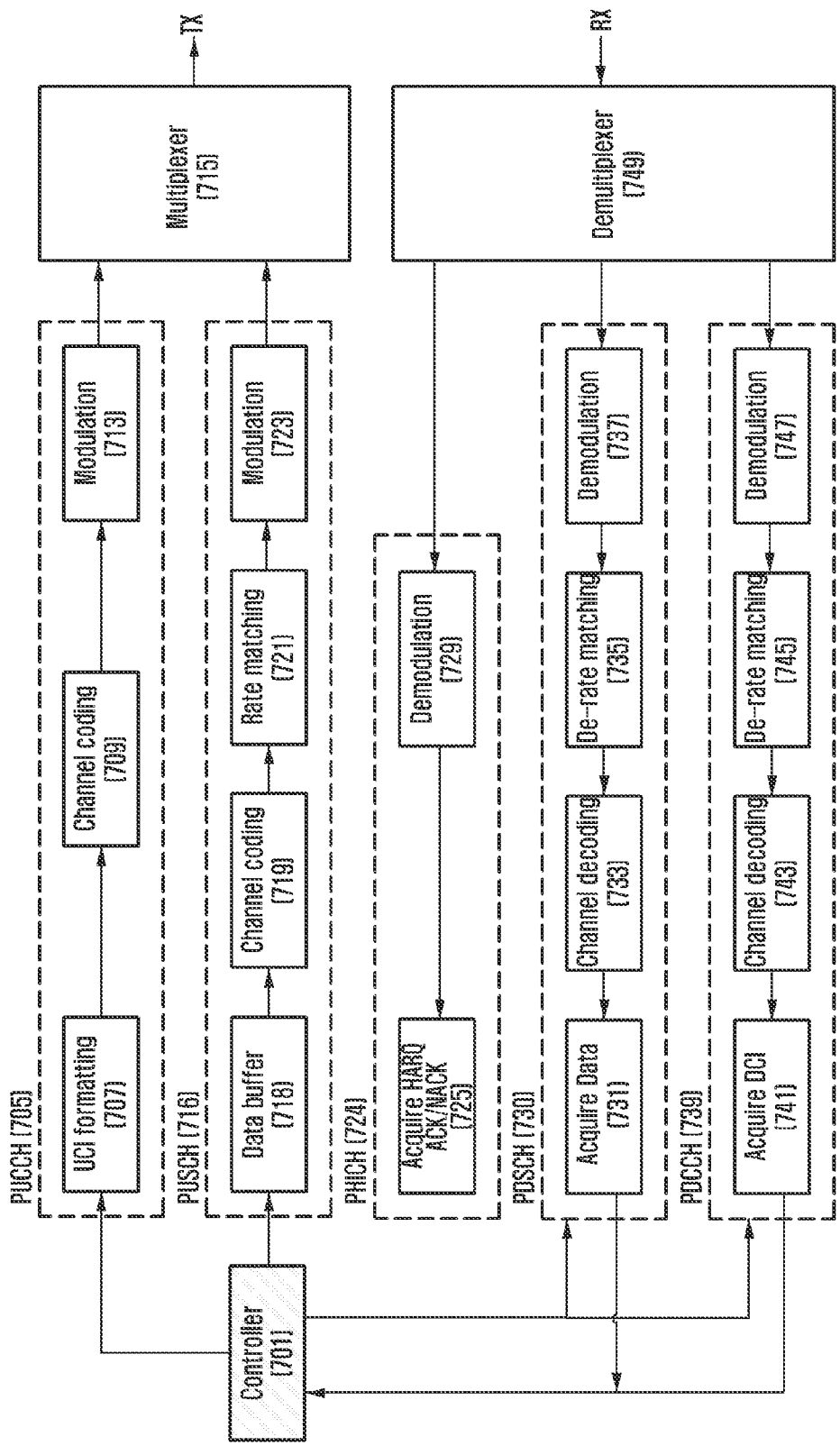
FIG. 7 is a block diagram illustrating a UE apparatus according to an exemplary embodiment of the present invention.

FIG. 7 is a block diagram illustrating a UE apparatus according to an exemplary embodiment of the present invention.

Referring to FIG. 7, the UE includes a transmitter having a PUCCH block 705, a PUSCH block 716, a multiplexer 715, a receiver having a PRICE block 724, a PDSCH block 730, a PDCCH block 739, a demultiplexer 749, and a controller 701. In the transmitter, PUCCH block 705 includes a UCI formatter 707, a channel coder 709, and a modulator 713. The PUSCH block 716 includes a data buffer 718, a channel coder 719, rate matching unit 721, and a modulator 723. In the receiver, the PHICH block 724 includes an HARQ ACK/NACK acquisition unit 725 and a modulator 729. The PDSCH block 730 includes a demodulator 737, a de-rate matching unit 735, a channel decoder 733, and a data acquisition unit 731. The PDCCH block 739 includes a demodulator 747, a de-rate matching unit 745, a channel decoder 743, and a Del acquisition unit 741. Although the numbers of the transmitters and receivers (except for PUCCH block) vary depending on the number of aggregated carriers, the description is made under the assumption of one transmitter and one receiver for simplicity.

The controller 701 adjusts the carrier aggregation state of the UE based on the DCI transmitted by the eNB and notifies the PUCCH block 705, PUSCH block 716, PHICH block 724, PDSCH block 730, and PDCCH block 739 of the information on the carrier for receiving PDSCH in cross-carrier scheduling and the HARQ ACK/NACK transmission in a specific uplink subframe corresponding to PDSCH according to an exemplary embodiment of the present invention. The information for HARQ ACK/NACK reception in a specific uplink subframe corresponding to PDSCH is of the above-described exemplary embodiment of the present invention.

The PUCCH block 705 configures HARQ ACK/NACK or CQI with Uplink Control Information (UCI) to be transmitted in a specific subframe correspondence to PDSCH by means of the UCI formatter 707 under the control of the controller 701, adds error correction capability to the UCI by means of the channel coder 709, modulates the channel coded signal by means of the modulator 713, and multiplexes the modulated signal with other signals by means of the multiplexer 715.

The PUSCH block 716 reads the data to be transmitted from the data buffer 718, adds error correction capability to the data by means of the channel coder 719, matches the rate of the data to be fit for the actual resource amount by means of the rate matching unit 721, modulates the rate-matched signal by means of the modulator 723, and multiplexes the modulated signal with other signals by means of the multiplexer 715.

The multiplexed signal is processed to generate Single Carrier Frequency Division Multiple Access (SC-FDMA) signal which is transmitted to the eNB.

In the receiver, the PHICH block 724 separates PHICH from the signal transmitted by the UE by means of the demultiplexer 749, demodulates the PHICH by means of the demodulator 729, and acquires HARQ ACK/NACK corresponding to PUSCH by means of the HARQ ACK/NACK acquisition unit 725.

The PDSCH block 730 separates PDSCH from the signal transmitted by the eNB by means of the demultiplexer 749, demodulates PDSCH by means of the demodulator 737, de-rate matches the demodulated signal to acquire the symbol before rate matching by means of the de-rate matching unit 735, decodes the symbols by means of the channel decoder 733, and acquires PDSCH data by means of the data acquisition unit 731. The data acquisition unit 731 notifies the PUCCH block 705 and the controller 701 of information on whether the decoding result is erroneous such that the PUCCH block 705 adjusts the uplink HARQ ACK/NACK generation and the controller 701 adjusts uplink HARQ ACK/NACK transmission timing.

The PDCCH block 739 separates PDCCH from the signal transmitted by the eNB by means of the demultiplexer 749, demodulates PDCCH by means of the demodulator 747, decodes the demodulated signal by means of the channel decoder 733, and acquires the DCI by means of the DCI acquisition unit 7411.

The control information transmission method of exemplary embodiments of the present invention is advantageous in that the UE transmits control information corresponding to data in a TDD mobile communication system capable of carrier aggregation to achieve broadband data rate.

White the invention has been shown and described with reference to certain exemplary embodiments thereof it will be understood by those skilled in the art that various changes in form and details may be made therein without departing from the spirit and scope of the present invention as defined by the appended claims and their equivalents.

What is claimed is:

1. A communication method of a terminal in a Time Division Duplex (TDD) radio communication system accomplishing broadband through carrier aggregation of primary and secondary cells of which aggregated carriers have different TDD Uplink-Downlink (UL-DL) configurations, the method comprising:
   receiving a Physical Downlink Shared CHannel (PDSCH) through the secondary cell;
   determining M based on a maximum value between $M_{primary}$ and $M_{secondary}$, wherein M is an integer greater or equal to 1,
   wherein $M_{primary}$ is a number of downlink associated subframe for a subframe n of the primary cell TDD UL-DL configuration, and wherein $M_{secondary}$ is a number of downlink associated subframe for a subframe n of the secondary cell TDD UL-DL configuration; and
   transmitting acknowledgement information corresponding to the PDSCH at the subframe n of the primary cell to a base station based on the determined M.

2. The method of claim 1, wherein the acknowledgement information is transmitted on a Physical Uplink Control CHannel (PUCCH) of the primary cell.

3. The method of claim 1, wherein the acknowledgement information is transmitted to the base station according to one of UL-DL configuration of the primary cell, UL-DL configuration of the secondary cell, and a specific UL-DL configuration with the exception of the UL-DL configurations of the primary and secondary cell.

4. The method of claim 1, wherein $M_{primary}$ and $M_{secondary}$ are determined based on a predetermined rule, respectively.

5. The method of claim 1, further comprising:
   if $M_{secondary}$ is less than M, setting Hybrid Automatic Repeat Request (HARQ) Acknowledgement (ACK)/Non-Acknowledgement (NACK) of a number of $M-M_{secondary}$ corresponding to the secondary cell to a Discontinuous Transmission (DTX) value; and
   if $M_{primary}$ is less than M, setting the HARQ ACK/NACK of a number of $M-M_{primary}$ corresponding to the primary cell to a DTX value.

6. The method of claim 1, wherein further comprising:
   mapping the acknowledgements corresponding to the received PDSCHs to a HARQ ACK/NACK processing table in a mapping order.

7. A terminal operating in a Time Division Duplex (TDD) radio communication system accomplishing broadband through carrier aggregation of primary and secondary cells of which aggregated carriers have different TDD Uplink-Downlink (UL-DL) configurations, the terminal comprising:
   a receiver configured to receive a Physical Downlink Shared CHannel (PDSCH) through the secondary cell;
   a controller configured to determine M based on a maximum value between $M_{primary}$ and $M_{secondary}$, wherein M is an integer greater or equal to 1, wherein $M_{primary}$ is a number of downlink associated subframe for a subframe n of the primary cell TDD UL-DL configuration, and wherein $M_{secondary}$ is a number of downlink associated subframe for a subframe n of the secondary cell TDD UL-DL configuration; and
   a transmitter configured to transmit acknowledgement information corresponding to the PDSCH at the subframe n of the primary cell to a base station based on the determined M.

8. The terminal of claim 7, wherein the transmitter is further configured to transmit the acknowledgement information on a Physical Uplink Control CHannel (PUCCH) of the primary cell.

9. The terminal of claim 7, wherein the transmitter is further configured to transmit the acknowledgement information to the base station according to one of UL-DL configuration of the primary cell, UL-DL configuration of the secondary cell, and a specific UL-DL configuration with the exception of the UL-DL configurations of the primary and secondary cell.

10. The terminal of claim 7, wherein $M_{primary}$ and $M_{secondary}$ are determined based on a predetermined rule, respectively.

11. The terminal of claim 7, further comprising:
   if $M_{secondary}$ is less than M, the controller is further configured to set Hybrid Automatic Repeat Request (HARQ) Acknowledgement (ACK)/Non-Acknowledgement (NACK) of a number of $M-M_{secondary}$ corresponding to the secondary cell to a Discontinuous Transmission (DTX) value; and
   if $M_{primary}$ is less than M, the controller is further configured to set the HARQ ACK/NACK of a number of $M-M_{primary}$ corresponding to the primary cell to a DTX value.

12. The terminal of claim 7, wherein the controller is further configured to map the acknowledgements corresponding to the received PDSCHs to a HARQ ACK/NACK processing table in a mapping order.

13. A base station operating in a Time Division Duplex (TDD) radio communication system accomplishing broadband through carrier aggregation of primary and secondary cells of which aggregated carriers have different TDD Uplink-Downlink (UL-DL) configurations, the base station comprising:

a transmitter configured to transmit a Physical Downlink Shared CHannel (PDSCH) at subframes of the secondary cell;

a controller configured to determine M based on a maximum value between $M_{primary}$ and $M_{secondary}$, wherein M is an integer greater or equal to 1, wherein $M_{primary}$ is a number of downlink associated subframe for a subframe n of the primary cell TDD UL-DL configuration, and wherein $M_{secondary}$ is a number of downlink associated subframe for a subframe n of the secondary cell TDD UL-DL configuration; and a receiver configured to receive acknowledgement information corresponding to the PDSCH at the subframe n of the primary cell from a terminal based on the determined M.

14. The base station of claim 13, wherein the acknowledgement information is received on a Physical Uplink Control CHannel (PUCCH) of the primary cell.

15. The base station of claim 13, wherein the acknowledgement information is received from a terminal according to one of UL-DL configuration of the primary cell, UL-DL configuration of the secondary cell, and a specific UL-DL configuration with the exception of the UL-DL configurations of the primary and secondary cell.

16. The base station of claim 13, wherein $M_{primary}$ and $M_{secondary}$ are determined based on a predetermined rule, respectively.

17. The base station of claim 13, further comprising:

is $M_{secondary}$ is less than M, the controller is further configured to set Hybrid Automatic Repeat Request (HARQ) Acknowledgement (ACK)/Non-Acknowledgement (NACK) of a number of $M-M_{secondary}$ corresponding to the secondary cell to a Discontinuous Transmission (DTX) value; and if $M_{primary}$ is less than M, the controller is further configured to set the HARQ ACK/NACK of a number of $M-M_{primary}$, corresponding to the primary cell to a DTX value.

18. The base station of claim 13, wherein the controller is further configured to map the acknowledgements corresponding to the received PDSCHs to a HARQ ACK/NACK processing table in a mapping order.

* * * * *